United States Patent
Nagasawa

(10) Patent No.: US 9,644,572 B2
(45) Date of Patent: May 9, 2017

(54) CONTROL DEVICE FOR INTERNAL COMBUSTION ENGINE

(75) Inventor: Hiroi Nagasawa, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 120 days.

(21) Appl. No.: 14/113,300

(22) PCT Filed: Jun. 20, 2011

(86) PCT No.: PCT/JP2011/064073
§ 371 (c)(1),
(2), (4) Date: Oct. 22, 2013

(87) PCT Pub. No.: WO2012/176271
PCT Pub. Date: Dec. 27, 2012

(65) Prior Publication Data
US 2014/0090627 A1   Apr. 3, 2014

(51) Int. Cl.
*F02M 25/07*   (2006.01)
*F02D 41/24*   (2006.01)
(Continued)

(52) U.S. Cl.
CPC ..... *F02M 25/0704* (2013.01); *F02D 41/2448* (2013.01); *F02B 3/06* (2013.01);
(Continued)

(58) Field of Classification Search
CPC ............ F02M 25/0704; F02M 25/0772; F02D 41/2448; F02D 41/2454; F02D 41/1458;
(Continued)

(56) References Cited

U.S. PATENT DOCUMENTS

2002/0170546 A1* 11/2002 Itoyama ................. F02B 37/22
                                                    123/568.27
2007/0074707 A1*  4/2007 Ogawa ................. F02D 13/0265
                                                    123/568.14
(Continued)

FOREIGN PATENT DOCUMENTS

JP    2007-255219 A    10/2007

*Primary Examiner* — Hai Huynh
*Assistant Examiner* — Gonzalo Laguarda
(74) *Attorney, Agent, or Firm* — Sughrue Mion, PLLC

(57) ABSTRACT

This invention relates to a control device for internal combustion engine for performing an exhaust recirculation control for controlling an operation condition of an exhaust recirculation device (50,52) according to a target exhaust gas recirculation amount (TRegr) set such that a detected air-fuel ratio (AFd) corresponds to an estimated air-fuel ratio (AFe). When the sign of the ratio (Rtregr) of the change amount of the actual target exhaust gas recirculation amount relative to the change amount of the base exhaust gas recirculation amount setting parameter (Q) used for the setting of the base exhaust gas recirculation amount (Regrb) is different from that of the ratio of the change amount of the referential target exhaust gas recirculation amount relative to the change amount of the base exhaust gas recirculation amount setting parameter, the performance of the learning function to calculate the learned correction value (KGn) on the basis of the instant correction value (KT) for correcting the current target exhaust gas recirculation amount such that the air-fuel ratio deviation (Raf) becomes zero is forbidden.

16 Claims, 9 Drawing Sheets

(51) Int. Cl.
*F02D 41/00* (2006.01)
*F02B 3/06* (2006.01)
*F02B 29/04* (2006.01)
*F02M 26/23* (2016.01)

(52) U.S. Cl.
CPC ...... *F02B 29/0406* (2013.01); *F02D 41/0072* (2013.01); *F02D 41/2454* (2013.01); *F02M 26/23* (2016.02); *Y02T 10/47* (2013.01)

(58) Field of Classification Search
CPC ............ F02D 41/0047; F02D 41/0052; F02D 41/0065
USPC ...... 123/568.21; 701/108; 73/114.72, 114.74
See application file for complete search history.

(56) References Cited

U.S. PATENT DOCUMENTS

2007/0144502 A1\* 6/2007 Ogawa ................ F02D 13/0265
123/568.14
2011/0308503 A1\* 12/2011 Yasui .................... F02D 41/005
123/568.21
2014/0074379 A1\* 3/2014 Aoyagi ............... F02D 41/2454
701/104

\* cited by examiner (A)

(B)

(C)

CONTROL DEVICE FOR INTERNAL COMBUSTION ENGINE

CROSS REFERENCE TO RELATED APPLICATIONS

This application is a National Stage of International Application No. PCT/JP2011/064073 filed Jun. 20, 2011, the contents of which are incorporated herein by reference in their entirety.

TECHNICAL FIELD

This invention relates to a control device for internal combustion engine.

BACKGROUND ART

An internal combustion engine having an exhaust gas recirculation device (hereinafter, this device will be referred to as—EGR device—) is described in the Patent Document 1. This EGR device supplies (i.e. re-circulates) an exhaust gas into a combustion chamber of the engine by introducing in an intake passage an exhaust gas discharged from the combustion chamber to an exhaust passage. Below, the exhaust gas supplied in the combustion chamber by the EGR device will be referred to as—EGR gas—and an amount of the EGR gas supplied into the combustion chamber will be referred to as—EGR gas amount—.

The EGR device described in the Patent Document 1 has an EGR control valve. This EGR control valve is constituted such that its opening degree can be changed. The EGR gas amount can be controlled by controlling the opening degree of the EGR control valve. Then, the EGR gas decreases an amount of a substance (in particular, nitrogen oxide) produced by combustion of a fuel in the combustion. That is, the EGR gas decreases an exhaust gas emission discharged from the combustion chamber.

The EGR gas amount for optimally decreasing the exhaust gas emission depending on the engine operation condition (i.e. the operation condition of the engine). In the engine described in the Patent Document 1, the EGR gas amounts for optimally decrease the exhaust gas emission depending on the engine operation condition are previously obtained by an experiment, etc., these obtained EGR gas amount are memorized in an electronic control device of the engine as target EGR gas amounts, the target EGR gas amount is acquired depending on the engine operation condition from the target EGR gas amounts memorized in the electronic control device during the engine operation (i.e. during the operation of the engine) and the opening degree of the EGR control valve is controlled such that the actual EGR gas amount corresponds to this acquired target EGR amount.

CITATION LIST

Patent Literature 1: JP2007-255219A

SUMMARY OF INVENTION

Technical Problem

As the EGR gas amount increases, an amount of the air sucked into the combustion chamber of the engine (hereinafter, this amount of the air will be referred to as—intake air amount—) decreases and as the EGR gas amount decreases, the intake air amount increases. Therefore, by controlling the opening degree of the EGR control valve, the intake air amount can be controlled and furthermore, an air-fuel ratio of a mixture gas formed in the combustion chamber (hereinafter, this air-fuel ration will be referred simply to as—air-fuel ratio—) can be controlled. For example, in order to control the actual air-fuel ratio to a particular air-fuel ratio, the actual air-fuel ratio can be controlled to the particular air-fuel ratio by suitably increasing the target EGR gas amount when the actual air-fuel ratio is larger than the particular air-fuel ratio (i.e. when the actual air-fuel ratio is leaner than the particular air-fuel ratio) and suitably decreasing the target EGR gas amount when the actual air-fuel ratio is smaller than the particular air-fuel ratio (i.e. when the actual air-fuel ratio is richer than the particular air-fuel ratio). That is, if the target EGR gas amount is increased when the actual air-fuel ratio is larger than the particular air-fuel ratio, the actual EGR gas amount increases and therefore, the intake air amount decreases. Therefore, in this case, the actual air-fuel ratio decreases and approaches the particular air-fuel ratio. On the other, if the target EGR gas amount is increased when the actual air-fuel ratio is smaller than the particular air-fuel ratio, the actual EGR gas amount decreases and therefore, the intake air amount increases. Therefore, in this case, the actual air-fuel ratio increases and then, approaches the particular air-fuel ratio. Thus, the actual air-fuel ratio is controlled to the particular air-fuel ratio.

The EGR gas amount previously obtained by the experiments, etc. as explained above is often an optimum EGR gas amount for accomplishing the expected property of the engine when the engine operation condition is a stationary condition (i.e. this property is a property expected as the property of the engine, for example, is an expected exhaust gas emission property, hereinafter, will be referred to as—expected engine property—). Therefore, in order to accomplish the expected engine property when the engine operation condition changes transiently (hereinafter, this condition will be referred to as—transient condition—), it may be necessary to correct the target EGR gas amount depending on the transient change of the engine operation condition. Further, the target EGR gas amount previously obtained by the experiments, etc. is often an optimum EGR gas amount for accomplishing the expected engine property when values of the parameters relating to the environment surrounding the engine and influencing the engine operation condition (for example, the atmospheric pressure, the atmospheric temperature, the temperature of the engine, etc.) are particular values (or are within a particular range). Therefore, in order to accomplish the expected engine property when the values of the above-mentioned parameters are not the above-mentioned particular values (or are not within the above-mentioned range), it may be necessary to correct the target EGR gas amount depending on the values of the above-mentioned parameters.

In this regard, a correction of the target EGR gas amount may be performed depending on the transient change of the engine operation condition so as to accomplish the expected engine property even when the engine operation condition is under the transient condition (hereinafter, this correction will be referred to as—transient correction) and a correction of the target EGR gas amount is performed depending on the values of the above-mentioned parameters so as to accomplish the expected engine property even when the values of the above-mentioned parameters are not the above-mentioned particular values (or are not within the above-mentioned particular range) (hereinafter, this correction will be referred to as—environmental correction—).

In this regard, the transient and environmental corrections are performed regardless of whether the actual air-fuel ratio conforms to the above-mentioned air-fuel ratio by these corrections. Therefore, if the transient or environmental correction is performed when a correction for increasing the target EGR gas amount (hereinafter, this correction will be referred to as—air-fuel ratio correction—) so as to increase the actual EGR gas amount since the actual air-fuel ratio is larger than the above-mentioned particular air-fuel ratio, the target EGR gas amount may be corrected so as to decrease the target EGR gas amount by the transient or environmental correction. Then, there is a possibility that the finally obtained target EGR gas amount (i.e. the target EGR gas amount corrected by the air-fuel ratio, transient and environmental corrections) becomes smaller than the current target EGR gas amount. In this regard, if the finally obtained target EGR gas amount becomes smaller than the current target EGR gas amount, the actual air-fuel ratio increases and then, becomes larger than the above-mentioned air-fuel ratio and as a result, the engine property separates considerably from the expected engine property. On the other hand, if the transient or environmental correction is performed when a correction for decreasing the target EGR gas amount (hereinafter, this correction will be also referred to as—air-fuel ratio correction—) so as to decrease the actual EGR gas amount since the actual air-fuel ratio is smaller than the above-mentioned air-fuel ratio, the target EGR gas amount may be corrected so as to increase the target EGR gas amount by the transient or environmental correction. Then, there is a possibility that the finally obtained target EGR gas amount (i.e. as explained above, the target EGR gas amount corrected by the air-fuel ratio, transient and environmental corrections) becomes larger than the current target EGR gas amount. In this regard, if the finally obtained target EGR gas amount becomes larger than the current target EGR gas amount, the actual air-fuel ratio decreases and then, becomes smaller than the above-mentioned particular air-fuel ratio and as a result, the engine property separates considerably from the expected engine property.

That is, there is a possibility that the engine property separates considerably from the expected engine property in the engine where the both of the correction of the target EGR gas amount performed in order to conform the actual air-fuel ratio to the particular air-fuel ratio (i.e. the air-fuel ratio correction) and the correction of the target EGR gas amount performed regardless of whether the actual air-fuel ratio conforms to the particular air-fuel ratio (i.e. the transient or environmental correction) may be performed. In this regard, the object of this invention is to restrict the considerable separation of the engine property from the expected engine property in such an engine.

Solution to Problem

The invention of this application relates to a control device for internal combustion engine, the control device comprising:

an air-fuel ratio detection means for detecting an air-fuel ratio of mixture gas generated in a combustion chamber; and an exhaust recirculation device introducing an exhaust gas into an intake passage, the exhaust gas being discharged from the combustion chamber to an exhaust passage, the control device being configured to:

calculate an estimated air-fuel ratio of the mixture gas generated in the combustion chamber, the estimated air-fuel ratio being an estimated value of the air-fuel ratio;

set a target amount of the recirculated exhaust gas so as to control a detected air-fuel ratio to match the estimated air-fuel ratio, the detected air-fuel ratio being an air-fuel ratio detected by the air-fuel detection means, the target amount being a target value of an amount of the exhaust gas introduced into the intake passage by the exhaust recirculation device; and perform an exhaust recirculation control for controlling an operation condition of the exhaust recirculation device so as to allow the exhaust gas having the target amount of the recirculated exhaust gas to be introduced into the intake passage by the exhaust recirculation device.

In this regard, as the air-fuel ratio detection means, any means for detecting the air-fuel ratio of the mixture gas formed in the combustion chamber can be employed and for example, a so-called air-fuel ratio sensor positioned on the exhaust passage of the engine can be employed. Further, the target exhaust gas recirculation amount is the amount of the exhaust gas introduced into the intake passage by the exhaust recirculation device and it can be said that this target exhaust gas recirculation amount is the amount representing the rate of the amount of the exhaust gas introduced into the intake passage by the exhaust recirculation device (i.e. the amount of the exhaust gas introduced into the intake passage by the exhaust recirculation device and then, sucked into the combustion chamber) relative to the amount of the gas sucked into the combustion chamber (this gas includes the air and the exhaust gas introduced into the intake passage by the exhaust recirculation device) or the amount representing the rate of the amount of the exhaust gas introduced into the intake passage by the exhaust recirculation device relative to the amount of the air sucked into the combustion chamber.

Further, the control device of the invention is configured to have a function to calculate an instant correction value, the instant correction value being a correction value for correcting a current target amount of the recirculated exhaust gas so as to control an air-fuel ratio deviation to be zero, the air-fuel ratio deviation being a deviation of the detected air-fuel ratio in reference to the estimated air-fuel ratio.

Further, the control device of this invention has a learning function to calculate a learned correction value and memorize the learned correction value, the learned correction value being an accumulated value of the instant correction values calculated successively.

Further, in the control device of this invention, it is performed that a correction to a relationship for base amount of the recirculated exhaust gas so as to allow the engine to perform with an expected property regardless of the deviation of the detected air-fuel ratio in reference to the estimated air-fuel ratio, the relationship being a relationship between a parameter for setting base amount of the recirculated exhaust gas and a base amount of the recirculated exhaust gas, the parameter being a predetermined parameter relating to the engine, the base amount being a base value regarding the target amount of the recirculated exhaust gas, the relationship being defined in advance.

Further, in the control device of this invention, it is set that the base amount of the recirculated exhaust gas from the corrected relationship for base amount of the recirculated exhaust gas based on the parameter for setting base amount of the recirculated exhaust gas, the parameter having been corrected by the instant correction value and the learned correction value, followed by employing the set base amount of the recirculated exhaust gas as the target amount of the recirculated exhaust gas; or correct the base amount of the recirculated exhaust gas by the instant correction value and the learned correction value, the base amount having been set from the corrected relationship for base amount of the recirculated exhaust gas based on the parameter for setting base amount of the recirculated exhaust gas, followed by employing the corrected base amount of the recirculated exhaust gas as the target amount of the recirculated exhaust gas, In this regard, the control device being configured to forbid the performance of the learning function upon a sign of a ratio of a change amount of an actual target amount of the recirculated exhaust gas in reference to a change amount of the parameter for setting base amount of the recirculated exhaust gas being different from a sign of a ratio of a change amount of a referential target amount of the recirculated exhaust gas in reference to the change amount of the parameter for setting base amount of the recirculated exhaust gas, in the case of:

the relationship for base amount of the recirculated exhaust gas before the correction to the relationship for base amount of the recirculated exhaust gas being referred to as a non-corrected relationship for base amount of the recirculated exhaust gas;

the relationship for base amount of the recirculated exhaust gas after the correction to the relationship for base amount of the recirculated exhaust gas being referred to as a corrected relationship for base amount of the recirculated exhaust gas;

the following target amount of the recirculated exhaust gas being referred to as the referential target amount of the recirculated exhaust gas: the target amount of the recirculated exhaust gas set based on the base amount of the recirculated exhaust gas set from the non-corrected relationship for base amount of the recirculated exhaust gas based on the parameter for setting target amount of the recirculated exhaust gas, the parameter having been corrected by the instant correction value and the learned correction value; or the target amount of the recirculated exhaust gas set based on the base amount of the recirculated exhaust gas obtained by correcting the base amount of the recirculated exhaust gas by the instant correction value and the learned correction value, the base amount having been set from the non-corrected relationship for base amount of the recirculated exhaust gas based on the parameter for setting base amount of the recirculated exhaust gas; and the following target amount of the recirculated exhaust gas being referred to as the actual target amount of the recirculated exhaust gas: the target amount of the recirculated exhaust gas set based on the base amount of the recirculated exhaust gas from the corrected relationship for base amount of the recirculated exhaust gas based on the parameter for setting target amount of the recirculated exhaust gas, the parameter having been corrected by the instant correction value and the learned correction value; or the target amount of the recirculated exhaust gas set based on the base amount of the recirculated exhaust gas obtained by correcting the base amount of the recirculated exhaust gas by the instant correction value and the learned correction value, the base amount having been set from the corrected relationship for base amount of the recirculated exhaust gas based on the parameter for setting base amount of the recirculated exhaust gas.

This invention has an advantage that the considerable separation of the property of the engine from the expected property can be restricted in the engine wherein the base exhaust gas recirculation amount relationship correction is performed for correcting the base exhaust gas recirculation amount relationship so as to obtain the expected property as the property of the engine regardless of the deviation of the detected air-fuel ratio relative to the estimated air-fuel ratio. In the case that when the sign of the ratio of the change amount of the actual target exhaust gas recirculation amount relative to the change amount of the base exhaust gas recirculation amount setting parameter (hereinafter, this ration will be referred to as—actual target exhaust gas recirculation amount change rate) is different from that of the ratio of the change amount of the referential target exhaust gas recirculation amount relative to the base exhaust gas recirculation amount setting parameter (hereinafter, this ratio will be referred to as—referential target exhaust gas recirculation amount change rate), the performance of the learning function continues and then, the correction of the base exhaust gas recirculation amount setting parameter or the base exhaust gas recirculation amount by the newly memorized learned correction value continues, the actual air-fuel ratio decreases although the air-fuel ratio of the mixture gas formed in the combustion chamber (hereinafter, this air-fuel ratio will be simply referred to as—air-fuel ratio—) should be increased in order to conform the detected air-fuel ratio to the estimated air-fuel ratio and on the other hand, the actual air-fuel ratio increases although the air-fuel ratio should be decreased in order to conform the detected air-fuel ratio to the estimated air-fuel ratio.

However, according to this invention, when the sign of the actual target exhaust gas recirculation amount change rate is different from that of the referential target exhaust gas recirculation amount change rate, the performance of the learning function is forbidden and therefore, the considerable separation of the property of the engine from the expected property can be restricted.

Further, another invention of this application relates to a control device for internal combustion engine, the control device comprising:

an air-fuel ratio detection means for detecting an air-fuel ratio of mixture gas generated in a combustion chamber; and an exhaust recirculation device introducing an exhaust gas into an intake passage, the exhaust gas being discharged from the combustion chamber to an exhaust passage, the control device being configured to:

calculate an estimated air-fuel ratio of the mixture gas generated in the combustion chamber, the estimated air-fuel ratio being an estimated value of the air-fuel ratio;

set a target amount of the recirculated exhaust gas so as to control a detected air-fuel ratio to match the estimated air-fuel ratio, the detected air-fuel ratio being an air-fuel ratio detected by the air-fuel detection means, the target amount being a target value of an amount of the exhaust gas introduced into the intake passage by the exhaust recirculation device;

calculate an estimated amount of the recirculated exhaust gas by using an intake air amount, the estimated amount of the recirculated exhaust gas being an estimated value of an amount of the exhaust gas introduced into the intake passage by the exhaust recirculation device, the intake air amount being an amount of air supplied to the combustion chamber; and perform an exhaust recirculation control for feedback-controlling an operation condition of the exhaust recirculation device based on a deviation of the estimated amount of the recirculated exhaust gas in reference to the target amount of the recirculated exhaust gas so as to control the deviation to be zero and thereby allow the exhaust gas having the target amount of the recirculated exhaust gas to be introduced into the intake passage by the exhaust recirculation device.

In this regard, as the air-fuel ratio detection means, any means for detecting the air-fuel ratio of the mixture gas formed in the combustion chamber can be employed and for example, a so-called air-fuel ratio sensor positioned on the exhaust passage of the engine can be employed. Further, the target exhaust gas recirculation amount is the amount of the exhaust gas introduced into the intake passage by the exhaust recirculation device and it can be said that this target exhaust gas recirculation amount represents a rate of the amount of the exhaust gas introduced into the intake passage by the exhaust recirculation device (i.e. the amount of the exhaust gas introduced into the intake passage by the exhaust recirculation device and then, sucked into the combustion chamber) relative to the amount of the gas sucked into the combustion chamber (this gas includes the air and the exhaust gas introduced into the intake passage by the exhaust recirculation device) or it can be said that this target exhaust gas recirculation amount represents a rate of the amount of the exhaust gas introduced into the intake passage by the exhaust recirculation device relative to the amount of the air sucked into the combustion chamber.

Further, the control device of this invention has a function to calculate an instant correction value, the instant correction value being a correction value for correcting a current target amount of the recirculated exhaust gas so as to control an air-fuel ratio deviation to be zero, the air-fuel ratio deviation being a deviation of the detected air-fuel ratio in reference to the estimated air-fuel ratio.

Further, the control device of this invention has a learning function to calculate a learned correction value and memorize the learned correction value, the learned correction value being an accumulated value of the instant correction values calculated successively.

Further, in the control device of this invention, it is performed that a correction to a relationship for base amount of the recirculated exhaust gas so as to allow the engine to perform with an expected property regardless of the deviation of the detected air-fuel ratio in reference to the estimated air-fuel ratio, the relationship being a relationship between a parameter for setting base amount of the recirculated exhaust gas and a base amount of the recirculated exhaust gas, the parameter being a predetermined parameter relating to the engine, the base amount being a base value regarding the target amount of the recirculated exhaust gas, the relationship being defined in advance.

Further, in the control device of this invention, it is calculated a correction coefficient for parameter and a correction coefficient for intake air amount by dividing a correction coefficient defined by the instant correction value and the learned correction value depending on a ratio between the air-fuel ratio deviation due to a difference related to the parameter for setting base amount of the recirculated exhaust gas and the air-fuel ratio deviation due to a difference related to the intake air amount, the correction coefficient for parameter being a correction coefficient for removing the air-fuel ratio deviation due to the difference related to the parameter for setting base amount of the recirculated exhaust gas, the correction coefficient for intake air amount being a correction coefficient for removing the air-fuel ratio deviation due to a difference related to the intake air amount; and It is set the base amount of the recirculated exhaust gas from the corrected relationship for base amount of the recirculated exhaust gas based on the parameter for setting base amount of the recirculated exhaust gas, the parameter having been corrected by the correction coefficient for parameter, followed by employing the set base amount of the recirculated exhaust gas as the target amount of the recirculated exhaust gas; or correct the base amount of the recirculated exhaust gas by the correction coefficient for parameter, the base amount having been set from the corrected relationship for base amount of the recirculated exhaust gas based on the parameter for setting base amount of the recirculated exhaust gas, followed by employing the corrected base amount of the recirculated exhaust gas as the target amount of the recirculated exhaust gas.

Further, in the control device of this invention, it is corrected the intake air amount by the correction coefficient for intake air amount, followed by calculating the estimated amount of the recirculated exhaust gas by using the corrected intake air amount, the estimated amount of the recirculated exhaust gas being an estimated value of an amount of the exhaust gas introduced into the intake passage by the exhaust recirculation device, the intake air amount being an amount of air supplied to the combustion chamber.

In this regard, the control device is configured to: forbid the performance of the learning function upon a sign of a ratio of a change amount of an actual target amount of the recirculated exhaust gas in reference to a change amount of the parameter for setting base amount of the recirculated exhaust gas being different from a sign of a ratio of a change amount of a referential target amount of the recirculated exhaust gas in reference to the change amount of the parameter for setting base amount of the recirculated exhaust gas; and then correct the parameter for setting base amount of the recirculated exhaust gas and the base amount of the recirculated exhaust gas by the learned correction value already having been memorized upon the performance of the learning function being forbidden, in the case of:

the relationship for base amount of the recirculated exhaust gas before the correction to the relationship for base amount of the recirculated exhaust gas being referred to as a non-corrected relationship for base amount of the recirculated exhaust gas;

the relationship for base amount of the recirculated exhaust gas after the correction to the relationship for base amount of the recirculated exhaust gas being referred to as a corrected relationship for base amount of the recirculated exhaust gas;

the following target amount of the recirculated exhaust gas being referred to as the referential target amount of the recirculated exhaust gas: the target amount of the recirculated exhaust gas set based on the base amount of the recirculated exhaust gas set from the non-corrected relationship for base amount of the recirculated exhaust gas based on the parameter for setting target amount of the recirculated exhaust gas, the parameter having been corrected by the correction coefficient for parameter; or the target amount of the recirculated exhaust gas set based on the base amount of the recirculated exhaust gas obtained by correcting the base amount of the recirculated exhaust gas by the correction coefficient for parameter, the base amount having been set from the non-corrected relationship for base amount of the recirculated exhaust gas based on the parameter for setting base amount of the recirculated exhaust gas; and the target amount of the recirculated exhaust gas being referred to as the actual target amount of the recirculated exhaust gas, the target amount being set based on the base amount of the recirculated exhaust gas obtained by correcting the following base amount of the recirculated exhaust gas by the correction coefficient for parameter: the base amount of the recirculated exhaust gas set from the corrected relationship for base amount of the recirculated exhaust gas based on the parameter for setting target amount of the recirculated exhaust gas, the parameter having been corrected by the correction coefficient for parameter; or the base amount of the recirculated exhaust gas set from the relationship for target amount of the recirculated exhaust gas, the relationship having been set based on the parameter for setting base amount of the recirculated exhaust gas.

This invention has an advantage that the considerable separation of the property of the engine from the expected property can be further surely restricted. That is, as explained above, in the case that when the sign of the actual target exhaust gas recirculation amount change rate is different from that of the referential target exhaust gas recirculation amount change rate, the performance of the learning function continues and then, the correction of the base exhaust gas recirculation amount setting parameter or the base exhaust gas recirculation amount by the newly memorized learned correction value continues, the actual air-fuel ratio decreases although the air-fuel ratio should be increased in order to conform the detected air-fuel ratio to the estimated air-fuel ratio and on the other hand, the actual air-fuel ratio increases although the air-fuel ratio should be decreased in order to conform the detected air-fuel ratio to the estimated air-fuel ratio.

However, according to this invention, when the sign of the actual target exhaust gas recirculation amount change rate is different from that of the referential target exhaust gas recirculation amount change rate, the performance of the learning function is forbidden and therefore, the considerable separation of the property of the engine from the expected property is restricted.

Further, the learned correction value has a function to remove a stationary difference relating to the control of the air-fuel ratio in the engine (hereinafter, this difference will be referred to as—stationary air-fuel ratio control difference—). Then, there is a high possibility that the learned correction value calculated and memorized when the sign of the actual target exhaust gas recirculation amount change rate is the same as that of the referential target exhaust gas recirculation amount change rate is a value which can suitably remove the stationary air-fuel ratio control difference. Therefore, if the correction of the base exhaust gas recirculation amount setting parameter or the base exhaust gas recirculation amount by the already memorized learned correction value is performed even when the performance of the learning function is forbidden, there is a possibility that the stationary air-fuel ratio control difference is removed. In particular, in the case that the performance of the learning function is forbidden immediately when the sign of the actual target exhaust gas recirculation amount change rate becomes different from that of the referential target exhaust gas recirculation amount change rate, such a possibility is high.

According to this invention, even when the performance of the learning function is forbidden, the correction of the base exhaust gas recirculation amount setting parameter or the base exhaust gas recirculation amount by the already memorized learned correction value continues and therefore, the considerable separation of the property of the engine from the expected property is further surely restricted.

Further, in the above-mentioned invention, the control device may be configured that the parameter for setting base amount of the recirculated exhaust gas and the base amount of the recirculated exhaust gas by the learned correction value being forbidden upon the performance of the learning function being forbidden.

The above-mentioned invention has an advantage that the considerable separation of the property of the engine from the expected property can be further surely restricted. That is, when the sign of the actual target exhaust gas recirculation amount change rate becomes different from that of the referential target exhaust gas recirculation amount change rate, there is a possibility that the already calculated and memorized learned correction value is not a value to desirably correct the base exhaust gas recirculation amount setting parameter or the base exhaust gas recirculation amount (i.e. a value to correct the base exhaust gas recirculation setting parameter or the base exhaust gas recirculation amount so as to set the target exhaust gas recirculation amount to increase the air-fuel ratio when the air-fuel ratio should be increased or a value to correct the base exhaust gas recirculation amount setting parameter or the base exhaust gas recirculation amount so as to the target exhaust gas recirculation amount to decrease the air-fuel ratio when the air-fuel ratio should be decreased). In particular, in the case that the performance of the learning function is not forbidden immediately when the sign of the actual target exhaust gas recirculation amount change rate becomes different from that of the referential target exhaust gas recirculation amount change rate, such a possibility is high.

According to this invention, when the performance of the learning function is forbidden, the correction of the base exhaust gas recirculation amount setting parameter or the base exhaust gas recirculation amount by the learned correction value is forbidden and therefore, the considerably separation of the property of the engine from the expected property can be further surely restricted.

Further, in the above-mentioned invention, the control device may be configured that the correction of the parameter for setting base amount of the recirculated exhaust gas or the base amount of the recirculated exhaust gas by the instant correction value being forbidden upon the performance of the learning function being forbidden.

The above-mentioned invention has an advantage that the considerable separation of the property of the engine from the expected property can be further surely restricted. That is, when the sign of the actual target exhaust gas recirculation amount change amount becomes different from that of the referential target exhaust gas recirculation amount change rate, the air-fuel ratio changes unintentionally (i.e. the air-fuel ratio changes to decrease when the air-fuel ratio should be increased and the air-fuel ratio changes to increase when the air-fuel ratio should be decreased) and therefore, if the target exhaust gas recirculation amount is set on the basis of the base exhaust gas recirculation setting parameter or the base exhaust gas recirculation amount corrected by the instant correction value and the operation condition of the exhaust recirculation device is controlled according to this set target exhaust gas recirculation amount, the air-fuel ratio decreases more and more when the air-fuel ratio should be increased or the air-fuel ratio increases more and more when the air-fuel ratio should be decreased.

According to this invention, when the performance of the learning function is forbidden, that is, when the sign of the actual target exhaust gas recirculation amount change rate becomes different from that the referential target exhaust gas recirculation amount change rate, the correction of the base exhaust gas recirculation amount setting parameter or the base exhaust gas recirculation amount by the instant correction value is forbidden and therefore, the considerable separation of the property of the engine from the expected property can be further surely restricted.

Further, the control device may be configured that the parameter for setting base amount of the recirculated exhaust gas or the base amount of the recirculated exhaust gas being corrected by a ratio of change rate of the target amount of the recirculated exhaust gas upon the ratio being smaller than 1, in the case of:

a rate of the change amount of the actual target amount of the recirculated exhaust gas in reference to the change amount of the parameter for setting base amount of the recirculated exhaust gas being referred to as an actual change rate of the target amount of the recirculated exhaust gas;

a rate of the change amount of the referential target amount of the recirculated exhaust gas in reference to the change amount of the parameter for setting base amount of the recirculated exhaust gas being referred to as a referential change rate of the target amount of the recirculated exhaust gas; and a ratio of the referential change rate in reference to the actual change rate being referred to as the ratio of change rate of the target amount of the recirculated exhaust gas.

The above-mentioned invention has an advantage that the excess correction of the base exhaust gas recirculation amount setting parameter by the learned correction value, furthermore, the excess correction of the base exhaust gas recirculation amount by the learned correction value, furthermore, the excess correction of the target exhaust gas recirculation amount by the learned correction value can be restricted. That is, the target exhaust gas recirculation amount change rate ratio smaller than "1" means that the change amount of the base exhaust gas recirculation amount per unit change amount of the base exhaust gas recirculation amount setting parameter in the corrected base exhaust gas recirculation amount relationship (i.e. the base exhaust gas recirculation amount relationship corrected by the base exhaust gas recirculation amount relationship correction) is larger than that in the uncorrected base exhaust gas recirculation amount relationship not corrected by the base exhaust gas recirculation amount relationship correction). In this case, if the correction of the base exhaust gas recirculation amount setting parameter is performed using the learned correction value itself, there is a possibility that the base exhaust gas recirculation amount setting parameter is excessively corrected. In this regard, the excess correction means a correction which cannot suitably converge the air-fuel ratio of the mixture gas on the estimated air-fuel ratio in the case that the target exhaust gas recirculation amount is set on the basis of the base exhaust gas recirculation amount set on the basis of the base exhaust gas recirculation amount relationship using the base exhaust gas recirculation amount setting parameter corrected by the correction and then, the operation condition of the exhaust recirculation device is controlled according to this set target exhaust gas recirculation amount. Then, the excess correction of the base exhaust gas recirculation amount setting parameter means the excess correction of the base exhaust gas recirculation amount, furthermore, the excess correction of the target exhaust gas recirculation amount.

However, in the above-explained invention, when the target exhaust gas recirculation amount change rate ratio is smaller than "1", the learned correction value is multiplied by the target exhaust gas recirculation amount change rate ratio. Then, the target exhaust gas recirculation amount change rate ratio by which the learned correction value is multiplied is smaller than "1" and therefore, the learned correction value multiplied by the target exhaust gas recirculation amount change rate ratio is smaller than the learned correction value not multiplied by the target exhaust gas recirculation amount change rate ratio. Thus, the degree of the correction of the base exhaust gas recirculation amount setting parameter by the learned correction value is smaller than the degree of the base exhaust gas recirculation amount setting parameter by the learned correction value not multiplied by the target exhaust gas recirculation amount rate ratio. Therefore, the excess correction of the base exhaust gas recirculation amount setting parameter by the learned correction value is restricted, furthermore, the excess correction of the base exhaust gas recirculation amount by the learned correction value is restricted, furthermore, the excess correction of the target exhaust gas recirculation amount by the learned correction value is restricted.

Further, the control device of the above-mentioned invention may further comprise a fuel supply means for supplying fuel into the combustion chamber, and the fuel supply means setting a target fuel-supply amount, the target fuel-supply amount being a target value of a fuel-supply amount to be supplied into the combustion chamber by the fuel supply means, the parameter for setting base amount of the recirculated exhaust gas being the fuel-supply amount corresponding to the target fuel-supply amount.

Further, the control device may further comprise a supplied-air amount detection means for detecting a supplied-air amount, the supplied-air amount being an amount of air supplied to the combustion chamber, the estimated air-fuel ratio being calculated based on: the fuel-supply amount corresponding to the target fuel-supply amount and a detected supplied-air amount, the detected supplied-air amount being a supplied-air amount detected by the supplied-air amount detection means; or the fuel-supply amount corresponding to the target fuel-supply amount corrected by the instant and learned correction values and the detected supplied-air amount.

Further, wherein the control device may further comprise: a fuel supply means for supplying fuel into the combustion chamber; and a supplied-air amount detection means for detecting a supplied-air amount, the supplied-air amount being an amount of air supplied to the combustion chamber, the fuel supply means setting a target fuel-supply amount, the target fuel-supply amount being a target value of a fuel-supply amount to be supplied into the combustion chamber by the fuel supply means, the estimated air-fuel ratio being calculated based on: the fuel-supply amount corresponding to the target fuel-supply amount and a detected supplied-air amount, the detected supplied-air amount being a supplied-air amount detected by the supplied-air amount detection means; or the fuel-supply amount corresponding to the target fuel-supply amount corrected by the instant and learned correction values, and the detected supplied-air amount.

Further, in the above-mentioned invention, the correction to the base amount of the recirculated exhaust gas may be a correction to correct the parameter for setting base amount of the recirculated exhaust gas or the base amount of the recirculated exhaust gas so as to control the amount of the exhaust gas introduced into the intake passage by the exhaust recirculation device to be an optimal amount to allow the engine to perform with an expected property, based on a value of an environmental parameter, the environmental parameter being a parameter: relating to environment surrounding the engine; and influencing the operation condition of the engine, or the correction to the base amount of the recirculated exhaust gas being a correction to correct the parameter for setting base amount of the recirculated exhaust gas or the base amount of the recirculated exhaust gas so as to control the amount of the exhaust gas introduced into the intake passage by the exhaust recirculation device upon the operation condition of the engine changing transiently to be an optimal amount to allow the engine to perform with an expected property, based on a value of an environmental parameter, the environmental parameter, or the correction to the base amount of the recirculated exhaust gas being a correction to correct the parameter for setting base amount of the recirculated exhaust gas or the base amount of the recirculated exhaust gas so as to control the amount of the exhaust gas introduced into the intake passage by the exhaust recirculation device upon the operation condition of the engine changing transiently to be an optimal amount to allow the engine to perform with an expected property, based on a value of an environmental parameter, the environmental parameter being a parameter: relating to environment surrounding the engine; and influencing the operation condition of the engine.

Further, in the above-mentioned invention, an estimated amount of the recirculated exhaust gas may be calculated by using an intake air amount, the estimated amount of the recirculated exhaust gas being an estimated value of an amount of the exhaust gas introduced into the intake passage by the exhaust recirculation device, the operation condition of the exhaust recirculation device may be controlled by a feedback-control based on a deviation of the estimated amount of the recirculated exhaust gas in reference to the target amount of the recirculated exhaust gas so as to control the deviation to be zero.

DESCRIPTION OF EMBODIMENTS

One embodiment of a control device for internal combustion engine of this invention (hereinafter, this embodiment will be referred to as—first embodiment—) will be explained. It should be noted that in the following explanation, "engine operation" means—operation of the engine—and "engine speed" means—speed of the engine—.

Figure 1:
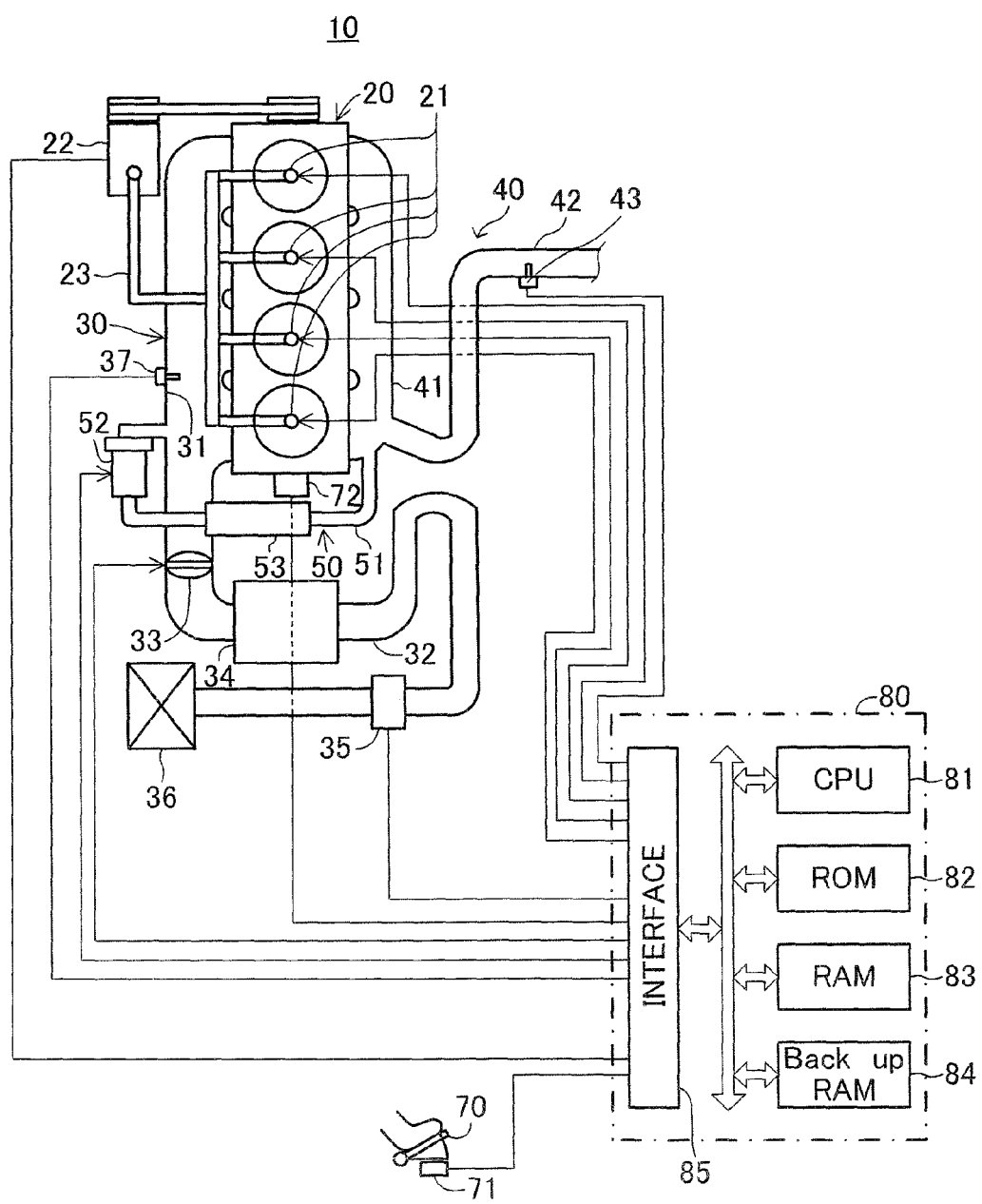
FIG. 1 is a view showing an internal combustion engine having a control device of a first embodiment.

The engine having the control device of the first embodiment is shown in FIG. 1. The engine shown in FIG. 1 is a compression self-ignition type engine (so-called diesel engine). In FIG. 1, 10 denotes the engine, 20 denotes a body of the engine 10, 21 denotes fuel injectors, 22 denotes a fuel pump, 23 denotes a fuel supply passage, 30 denotes an intake passage, 31 denotes an intake manifold, 32 denotes an intake pipe, 33 denotes a throttle valve, 34 denotes an intercooler, 35 denotes an air flow meter, 36 denotes an air cleaner, 37 denotes an intake pressure sensor, 40 denotes an exhaust passage, 41 denotes an exhaust manifold, 42 denotes an exhaust pipe, 43 denotes an air-fuel ratio sensor, 50 denotes an exhaust gas recirculation device (hereinafter, this device will be referred to as—EGR device—), 70 denotes an acceleration pedal, 71 denotes an acceleration pedal depression amount sensor, 72 denotes a crank position sensor and 80 denotes an electronic control unit. The intake passage 30 is constituted by the intake manifold 31 and the intake pipe 32. The exhaust passage 40 is constituted by the exhaust manifold 41 and the exhaust pipe 41.

The electronic control unit 80 is constituted by a microcomputer. Further, the electronic control unit 80 has a CPU (microprocessor) 81, a ROM (read only memory) 82, a RAM (random access memory) 83, a back-up RAM 84 and an interface 85. The CPU 81, the ROM 82, the RAM 83, the back-up RAM 84 and the interface 85 are connected to each other by a bidirectional bus.

The fuel injectors 21 are mounted on the body 20 of the engine. The fuel pump 22 is connected to the fuel injectors 21 via the fuel supply passage 23. The fuel pump 22 supplies a fuel having a high pressure to the fuel injectors 21 via the fuel supply passage 23. Further, the fuel injectors 21 are electrically connected to the interface 85 of the electronic control unit 80. The electronic control unit 80 supplies a command signal for making the fuel injector 21 inject the fuel to each fuel injector 21. Further, the fuel pump 22 is electrically connected to the interface 85 of the electronic control unit 80. The electronic control unit 80 supplies to the fuel pump 22 a control signal for controlling the operation condition of the fuel pump 22 such that the pressure of the fuel supplied from the fuel pump 22 to the fuel injectors 21 is maintained at a predetermined pressure. It should be noted that each fuel injector 21 is mounted on the body of the engine such that fuel injection hole thereof exposes to an interior of a combustion chamber. Therefore, when the command signal is supplied from the electronic control unit 80 to the fuel injector 21, the fuel injector 21 injects the fuel directly into the combustion chamber.

The intake manifold 31 branches into a plurality of pipes at its one end and these branch pipes are connected to intake ports (not shown), respectively, formed corresponding to the combustion chambers of the body 20 of the engine. Further, the other end of the intake manifold 31 is connected to one end of the intake pipe 32.

The exhaust manifold 41 branches into a plurality of pipes at its one end and these branch pipes are connected to exhaust ports (not shown), respectively, formed corresponding to the combustion chambers of the body 20 of the engine. Further, the other end of the exhaust manifold 41 is connected to one end of the exhaust pipe 42.

The throttle valve 33 is positioned in the intake pipe 32. Further, when an opening degree of the throttle valve 33 (hereinafter, this opening degree will be referred to as—throttle valve opening degree—) is changed, a flow area in the intake pipe 32 at an area where the throttle valve 33 is positioned changes. Thereby, an amount of the air flowing through the throttle valve 33 changes and therefore, an amount of the air sucked into the combustion chamber changes. An actuator for changing an operation condition of the throttle valve 33 (i.e. the throttle valve opening degree) is connected to the throttle valve 33 (hereinafter, this actuator will be referred to as—throttle valve actuator—). The throttle actuator is electrically connected to the interface 85 of the electronic control unit 80. The electronic control unit 80 supplies to the throttle valve actuator a control signal for driving the throttle valve actuator so as to control the throttle valve opening degree to the target throttle valve opening degree.

The intercooler 34 is positioned on the intake pipe 32 upstream of the throttle valve 33. The intercooler 34 cools an air flowing thereinto.

The air flow meter 35 is positioned on the intake pipe 32 upstream of the intercooler 34. Further, the air flow meter 35 is electrically connected to the interface 85 of the electronic control unit 80. The air flow meter 35 outputs an output value corresponding to an amount of the air flowing therethrough. This output value is input into the electronic control unit 80. The electronic control unit 80 calculates the amount of the air flowing through the air flow meter 35, therefore, the amount of the air sucked into the combustion chamber on the basis of this output value.

The intake pressure sensor 37 is positioned on the intake passage 30 downstream of the throttle valve 33 (concretely, on the intake manifold 31). Further, the intake pressure sensor 37 is electrically connected to the interface 85 of the electronic control unit 80. The intake pressure sensor 37 outputs an output value corresponding to a pressure of a gas surrounding it (i.e. the pressure of the gas in the intake manifold 31 and sucked into the combustion chamber). The electronic control unit 80 calculates on the basis of this output value the pressure of the gas surrounding the intake pressure sensor 37, that is, the pressure of the gas sucked into the combustion chamber (hereinafter, this pressure will be referred to as—intake pressure—).

The air-fuel ratio sensor 43 is positioned on the exhaust passage 40 (concretely, on the exhaust pipe 42). Further, the air-fuel ratio sensor 43 is electrically connected to the interface 85 of the electronic control unit 80. The air-fuel ratio sensor 43 outputs an output value corresponding to an oxygen concentration in the exhaust gas reaching there. The electronic control unit 80 calculates on this output value an air-fuel ratio of a mixture gas formed in the combustion chamber (hereinafter, this air-fuel ratio will be simply referred to as—air-fuel ratio of the mixture gas—or—air-fuel ratio—).

The acceleration pedal depression amount sensor 71 is connected to the acceleration pedal 70. Further, the acceleration pedal depression amount sensor 71 is electrically connected to the interface 85 of the electronic control device 80. The acceleration pedal depression amount sensor 71 outputs an output value corresponding to the depression amount of the acceleration pedal 70. This output value is input into the electronic control device 80. The electronic control device 80 calculates on the basis of this output value the depression amount of the acceleration pedal 70, therefore, a torque required to the engine.

The crank position sensor 72 is positioned adjacent to a crank shaft (not shown) of the engine. Further, the crank position sensor 72 is electrically connected to the interface 85 of the electronic control unit 80. The crank position sensor 72 outputs an output value corresponding to a rotational phase of the crank shaft. This output value is input into the electronic control unit 80. The electronic control unit 80 calculates on the basis of this output value the engine speed.

The EGR device 50 has an exhaust gas recirculation passage (hereinafter, this passage will be referred to as—EGR passage—) 51, an exhaust gas recirculation control valve (hereinafter, this control valve will be referred to as—EGR control valve—) 52 and an exhaust gas recirculation cooler (hereinafter, this cooler will be referred to as—EGR cooler—) 53. The EGR device 50 is a device for introducing into the intake passage 30 via the EGR passage 51 the exhaust gas discharged from the combustion chamber to the exhaust passage 40. One end of the EGR passage 51 is connected to the exhaust passage 40 (concretely, the exhaust manifold 41) and the other end of the EGR passage 51 is connected to the intake passage 30 (concretely, the intake manifold 31). That is, the EGR passage 51 connects the exhaust passage 40 to the intake passage 30. The EGR control valve 52 is positioned in the EGR passage 51. By changing the opening degree of the EGR control valve 52 (hereinafter, this opening degree will be referred to as—EGR control valve opening degree—), an amount of the exhaust gas flowing through the EGR control valve 52 is changed and therefore, an amount of the exhaust gas introduced into the intake passage 30 is changed. The EGR control valve 52 has therein an actuator for changing an operation condition of the EGR control valve (i.e. the EGR control valve opening degree) (hereinafter, this actuator will be referred to as—EGR control valve actuator—). The EGR control valve actuator is electrically connected to the electronic control device 80. The electronic control device 80 supplies to the EGR control valve actuator a control signal for driving the EGR control valve actuator so as to control the EGR control valve opening degree to the target EGR control valve opening degree. It should be noted that in the following explanation, "EGR gas" means—exhaust gas introduced into the intake passage by the EGR device—and "EGR gas amount" means—amount of the EGR gas—.

Figure 2:
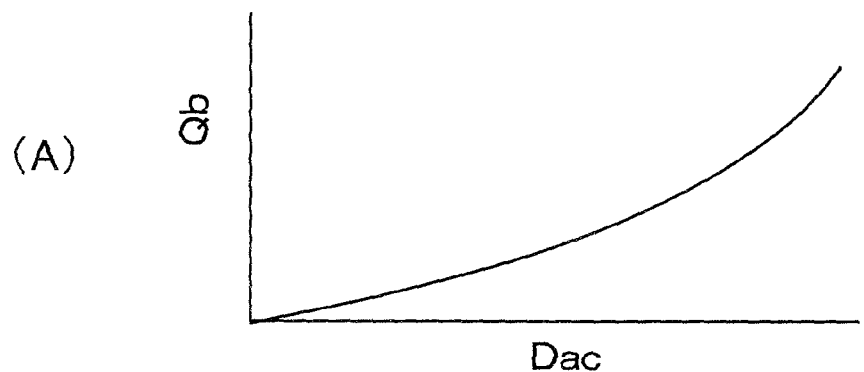
FIG. 2(A) is a view showing a map used for setting a base furl injection amount.
FIG. 2(B) is a view showing a map used for setting a base throttle valve opening degree and FIG. 2(C) is a view showing a map used for setting a base EGR rate.
Figure 2:
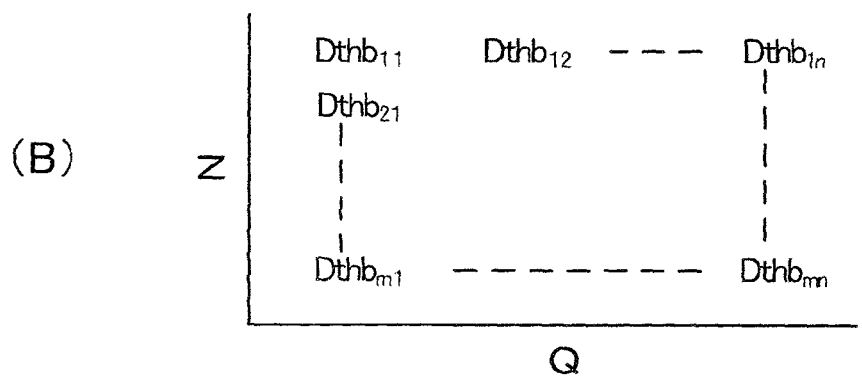
Figure 2:
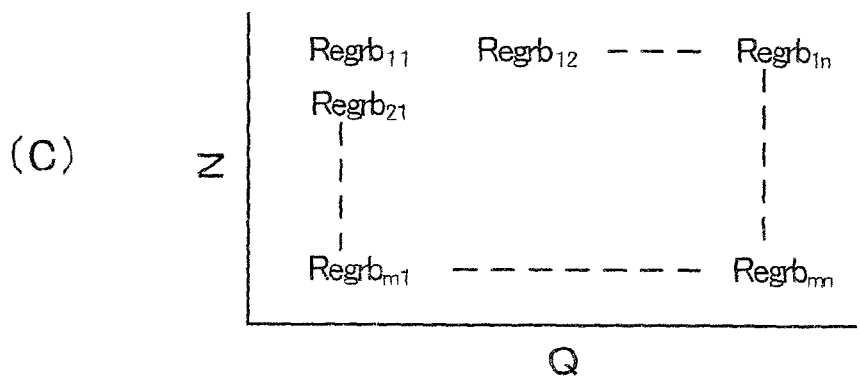

Next, a control of the fuel injector of the first embodiment will be explained. It should be noted that in the following explanation, "fuel injection amount" means—amount of the fuel injected from the fuel injector—. In the first embodiment, most suitable fuel injection amounts depending on the depression amount of the acceleration pedal are previously obtained by an experiment, etc. Then, as shown in FIG. 2, these obtained fuel injection amounts are memorized in the electronic control unit as base fuel injection amounts Qb in the form of a map as a function of the depression amount Dac of the acceleration pedal. Then, during the engine operation, the base fuel injection amount Qb corresponding to the current depression amount Dac of the acceleration pedal is acquired from the map shown in FIG. 2(A) and then, this acquired base fuel injection amount Qb is set to a target fuel injection amount. Then, a command signal for making the fuel injector inject the fuel having thus set target fuel injection amount is supplied from the electronic control unit to the fuel injector. It should be noted that as shown in FIG.

2(A), the base fuel injection amount Qb becomes large as the depression amount Dac of the acceleration pedal becomes large.

Next, a control of the throttle valve of the first embodiment will be explained. In the first embodiment, most suitable throttle valve opening degrees depending on the engine operation condition are previously obtained by an experiment, etc. Then, as shown in FIG. 2(B), these obtained throttle valve opening degrees are memorized in the electronic control device as base throttle valve opening degrees Dthb in the form of a map as a function of the fuel injection amount Q and the engine speed N. Then, during the engine operation, the base throttle valve opening degree Dthb corresponding to the current fuel injection amount Q and the current engine speed N is acquired from the map shown in FIG. 2(B) and then, this acquired base throttle valve opening degree Dthb is set to a target throttle valve opening degree. Then, a control signal for driving the throttle valve actuator to drive the throttle valve so as to control the throttle valve opening degree to the thus set target throttle valve opening degree TDth is supplied to the electronic control unit. It should be noted that in the map shown in FIG. 2(B), as the fuel injection amount Q becomes large, the base throttle valve opening degree Dthb and as the engine speed N becomes large, the base throttle valve opening degree Dthb becomes large.

Next, a control of the EGR control valve of the first embodiment will be explained. In the first embodiment, during the engine operation, a target value of an EGR rate (i.e. a rate of a mass of the exhaust gas occupying a mass of all gas sucked into the combustion chamber) is set as a target EGR rate (the detail of a method for setting this target EGR rate will be explained below). Then, the EGR control valve actuator is controlled by a feedback control by the electronic control unit so as to control the EGR control valve opening degree such that the actual EGR rate (a method for calculating this EGR rate will be explained below) corresponds to the above-mentioned set target EGR rate. Concretely, a control signal for deriving the EGR control valve actuator so as to drive the EGR control valve such that the EGR control valve opening degree becomes large if the actual EGR rate is smaller than the target EGR rate is supplied from the electronic control unit to the EGR control valve actuator. On the other hand, a control signal for driving the EGR control valve actuator so as to drive the EGR control valve such that the EGR control valve opening degree becomes small if the actual EGR rate is larger than the target EGR rate is supplied from the electronic control unit to the EGR control valve actuator.

Next, a method for calculating the actual EGR rate of the first embodiment will be explained. In the first embodiment, the actual EGR rate Regr is calculated according to the following formula 1. In the formula 1, "Gc" is a total amount of the gas sucked into the combustion chamber (i.e. the mixture gas of the air and the EGR gas) in one intake stroke and "Ga" is an amount of the air supplied to the combustion chamber in one intake stroke. It should be noted that the total amount of the gas sucked into the combustion chamber in one intake stroke can be calculated, for example, on the basis of parameter such as the engine speed, the intake pressure, etc. and the amount of the air sucked into the combustion chamber in one intake stroke can be calculated, for example, on the basis of the amount of the air detected by the air flow meter.

$$Regr = (Gc - Ga)/Gc \quad (1)$$

Next, a method for setting the target EGR rate of the first embodiment will be explained. In the first embodiment, under the condition that the operation condition of the engine shown in FIG. 1 is maintained at a state operation condition (i.e. at a state that the fuel injection amount and the engine speed are maintained constant) and parameters relating to the environment surrounding the engine and influencing the engine operation condition (for example, the atmospheric pressure, the atmospheric temperature, the temperature of the engine, etc. and hereinafter, the parameter will be referred to as —environmental parameter—) are particular values, suitable EGR rates (i.e. rates of the mass of the exhaust gas occupying the mass of all gas sucked into the combustion chamber) depending on the combination of the fuel injection amount and the engine speed are previously obtained by an experiment, etc. Then, as shown in FIG. 2(C), the obtained EGR rates are memorized in the electronic control unit as base EGR rates Regrb in the form of a map as a function of the fuel injection amount Q and the engine speed N. It should be noted that in the map shown in FIG. 2(C), as the fuel injection amount Q becomes large, the base EGR rate Regrb becomes small and as the engine speed N becomes large, the base EGR rate Regrb becomes small.

Then, as shown in the following formula 2, the base EGR rate Regrb is acquired from the map shown in FIG. 2(C) by using a fuel injection amount obtained by multiplying the target fuel injection amount set during the engine operation by a correction coefficient (the detail of this correction coefficient will be explained below) and the current engine speed as the fuel injection amount Q and the engine speed N for acquiring the base EGR rate Regrb from the map shown in FIG. 2(C), respectively. That is, the fuel injection amount obtained by correcting the target fuel injection amount set during the engine operation by the correction coefficient is used for acquiring the base EGR rate Regrb from the map shown in FIG. 2(C). It should be noted that in the formula 2, "Q" is the fuel injection amount used for acquiring the base EGR rate from the map shown in FIG. 2(C), "TQ" is the target fuel injection amount and "K" is the correction coefficient.

$$Q = TQ \times K \quad (2)$$

Figure 3:
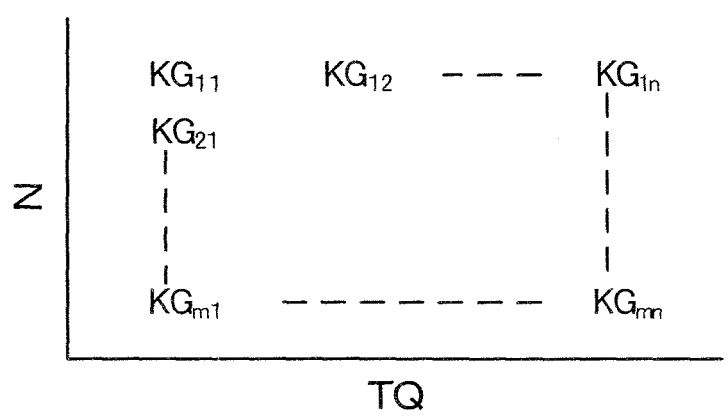
FIG. 3 is a view showing a map used for acquiring a learned correction value.

Next, the correction coefficient of the first embodiment will be explained. In the first embodiment, as shown in FIG. 3, the correction coefficient K is calculated by adding an instant correction value, a learned correction value (the details of the instant correction value and the learned correction value will be explained below) and "1" together. It should be noted that in the formula 3, "K" is the correction coefficient, "KT" is the instant correction value and "KG" is the learned correction value.

$$K = KT + KG + 1 \quad (3)$$

Next, the instant correction value of the first embodiment will be explained. It should be noted that in the following explanation, "detected air-fuel ratio" means —air-fuel ratio of the mixture gas detected by the air-fuel ratio sensor—, "estimated air-fuel ratio" means —estimation value of the air-fuel ratio of the mixture gas— and "intake air amount" means —amount of the air detected by the air flow meter—.

In the first embodiment, as shown in the following formula 4, a value obtained by dividing the estimated air-fuel ratio by the detected air-fuel ratio (hereinafter, this value will be referred to as —air-fuel ratio difference ratio—) is calculated. In the formula 4, "Raf" is the air-fuel ratio difference ratio, "AFe" is the estimated air-fuel ratio and "AFd" is the detected air-fuel ratio. Further, as shown in the following formula 5, the estimated air-fuel ratio is a value obtained by dividing the intake air amount by a value obtained by multiplying the target fuel injection amount by the correction coefficient. In the formula 5, "AFe" is the estimated air-fuel ratio, "K" is the correction coefficient, "TQ" is the target fuel injection amount and "Ga" is the intake air amount. Further, it can be said that the air-fuel ratio difference ratio is a value expressing the deviation of the detected air-fuel ratio relative to the estimated air-fuel ratio.

$$Raf=AFe/AFd \quad (4)$$

$$AFe=Ga/(TQ \times K) \quad (5)$$

Then, when the air-fuel ratio difference ratio is not "1" (i.e. when the detected air-fuel ratio does not correspond to the estimated air-fuel ratio), a correction value which can make the air-fuel ratio difference ratio "1" by correcting the correction coefficient currently used for correcting the target fuel injection amount for calculating the fuel injection amount used for acquiring the base EGR rate is calculated as the instant correction value. In other words, when the air-fuel ratio difference ratio is not "1", a correction value relative to the fuel injection amount for acquiring the base EGR rate which can make the air-fuel ratio difference ratio "1" by correcting the fuel injection amount currently used for acquiring the base EGR rate such that the air-fuel ratio difference ratio becomes "1" is calculated as the instant correction value.

Next, the learned correction value of the first embodiment will be explained. In the first embodiment, as shown in the following formula 6, a newly learned correction value is calculated by adding the continuously calculated instant correction value and the currently used learning correction value together. In the formula 6, "KGn" is the newly calculated learned correction value (i.e. the updated learned correction value), "KT" is the instant correction value and "KGp" is the currently used learned correction value.

$$KGn=KT+KGp \quad (6)$$

It should be noted that the thus calculated new learned correction value KGn is memorized as a learned correction value KG corresponding to the current target fuel injection amount TQ and the current engine speed N among the learned correction values KG memorized in the map shown in FIG. 3. This calculation and memorizing of the new learned correction value correspond to the update and learning of the learned correction value. Then, during the engine operation, the instant correction value is calculated on the basis of the air-fuel ratio difference ratio as explained above and the learned correction value KG is acquired from the map shown in FIG. 3 on the basis of the current target fuel injection amount TQ and the current engine speed N. Then, the correction coefficient K is calculated by applying the thus acquired learned correction value KG and the instant correction value calculated as explained above to the formula 3. It should be noted that the initial value of the learned correction value KG memorized in the map shown in FIG. 3 is "0".

In the first embodiment, the map shown in FIG. 2(C) is corrected such that the EGR rate becomes the most suitable EGR rate for obtaining the expected property of the engine depending on the environment surrounding the engine influencing the engine operation condition. Next, this correction of the map (hereinafter, this correction will be referred to as—environmental correction—) will be explained.

The map shown in FIG. 2(C) is prepared without considering values of parameters relating to the environment surrounding the engine influencing the engine operation condition (for example, the parameters such as the atmospheric pressure, the atmospheric temperature, the temperature of the engine, etc. and hereinafter, this parameter will be referred to as—environmental parameter—). That is, the map shown in FIG. 2(C) is a map prepared under the condition that the value of the environmental parameter is the particular value. Therefore, in order to accomplish the expected property of the engine (for example, the expected exhaust emission property, etc. and hereinafter, this property will be referred to as—expected engine property—) when the value of the environmental parameter becomes different from the particular value, it is necessary to correct the EGR rate depending on the value of the environmental parameter such that the expected engine property is obtained. In this regard, in the first embodiment, the environmental correction for correcting the map shown in FIG. 2(C) is performed depending on the value of the environmental parameter such that the expected engine property is accomplished. Thereby, as a result, the base EGR rate is corrected by the environmental correction and therefore, the target EGR rate is corrected. Then, the base EGR rate is acquired from the map shown in FIG. 2(C) corrected by the environmental correction using the target fuel injection amount corrected by the correction coefficient as the fuel injection amount for acquiring the base EGR rate, this base EGR rate is set to the target EGR rate and then, the expected engine property is accomplished by controlling the operation condition of the EGR control valve according to this target EGR rate.

In the first embodiment, when the particular condition is satisfied, the learning of the learned correction value is forbidden. Next, the forbiddance of the learning of the learned correction value of the first embodiment will be explained.

In the first embodiment, as explained above, the map shown in FIG. 2(C) is corrected by the environmental correction. In this regard, the environmental correction is a correction performed regardless of the air-fuel ratio difference ratio. Therefore, in the map shown in FIG. 2(C) not corrected by the environmental correction, as the fuel injection amount for acquiring the base EGR rate becomes large, the base EGR rate becomes small and on the other hand, in the map shown in FIG. 2(C) corrected by the environmental correction, as the fuel injection amount for acquiring the base EGR rate becomes large, the base EGR rate may become large at least in a part of the area thereof. That is, when the base EGR rate acquired from the map shown in FIG. 2(C) not corrected by the environmental correction is referred to as—reference base EGR rate—and the target EGR rate set on the basis of the reference base EGR rate is referred to as—referential target EGR rate—, in the case that the base EGR rate is acquired from the map shown in FIG. 2(C) corrected by the environmental correction, the sign of the ratio of the change amount of the actually acquired base EGR rate relative to the change amount of the fuel injection amount for acquiring the base EGR rate and therefore, the ratio of the change amount of the target EGR rate relative to that of the fuel injection amount for acquiring the base EGR rate (i.e. the change amount of the target EGR rate set on the basis of the base EGR rate acquired from the map shown in FIG. 2(C) corrected by the environmental correction) (hereinafter, this ratio will be referred to as—actual target EGR rate change rate—) may be opposite to that of the ratio of the change amount of the reference base EGR rate relative to that of the fuel injection amount for acquiring the base EGR rate and therefore, the ratio of the change amount of the referential target EGR rate relative to that of the fuel injection amount for acquiring the base EGR rate (hereinafter, this ratio will be referred to as—referential target EGR rate change rate).

In the first embodiment, during the engine operation, when the map shown in FIG. 2(C) is corrected by the environmental correction, the actual or referential target EGR rate change rate is calculated. Then, when the sign of the target EGR rate change rate is the same as that of the referential target EGR rate change rate, the above-explained learning of the learned correction value is performed and on the other hand, when the sign of the actual target EGR rate change rate is different from that of the referential target EGR rate change rate, the above-explained learning of the learned correction value is forbidden.

The first embodiment has an advantage that it is restricted that the property of the engine largely differs from the expected engine property. That is, in the case that when the sign of the actual target EGR rate change rate is different from that of the referential target EGR rate change rate, the learning of the learned correction value continues and then, the correction of the fuel injection amount for acquiring the base EGR rate by the newly memorized learned correction value continues, the actual air-fuel ratio becomes small although the air-fuel ratio of the mixture gas should be increased in order to correspond the detected air-fuel ratio to the estimated air-fuel ratio. In this case, the air-fuel ratio of the mixture gas separates from the air-fuel ratio which can obtain the expected engine property and then, when the detected air-fuel ratio has conclusively corresponded to the estimated air-fuel ratio, the air-fuel ratio of the mixture gas becomes largely smaller than the air-fuel ratio which can obtain the expected engine property. Thus, the property of the engine largely separates from the expected engine property. On the other hand, even when the air-fuel ratio of the mixture gas should be decreased in order to correspond the detected air-fuel ratio to the estimated air-fuel ratio, the actual air-fuel ratio becomes large. In this case, the air-fuel ratio of the mixture gas separates from the air-fuel ratio which can obtain the expected engine property and then, when the detected air-fuel ratio has conclusively corresponded to the estimated air-fuel ratio, the air-fuel ratio of the mixture gas becomes largely larger than the air-fuel ratio which can obtain the expected engine property. Thus, the property of the engine largely separates from the expected engine property. However, according to the first embodiment, when the sign of the actual target EGR rate change rate is different from that of the referential target EGR rate change rate, the learning of the learned correction value is forbidden and therefore, it is restricted that the property of the engine largely separates from the expected engine property.

It should be noted that various methods, for example, the following method can be employed as a concrete method for judging if the sign of the actual target EGR rate change rate is the same as that of the referential target EGR rate change rate. That is, in the case that the sign of the actual target EGR rate change rate is the same as that of the referential target EGR rate change rate, a value obtained by dividing the change amount per unit time of the target EGR rate by the change amount per unit time of the fuel injection amount for acquiring the corresponding base EGR rate, that is, the actual target EGR rate change rate is negative. Thus, a method for judging that the sign of the actual target EGR rate change rate is the same as that of the referential target EGR rate change rate when the actual target EGR rate change rate is negative and on the other hand, judging that the sign of the actual target EGR rate change rate is different from that of the referential target EGR rate change rate when the actual target EGR rate change rate is positive can be employed.

Further, when the sign of the actual target EGR rate change rate is different from that of the referential target EGR rate change rate, the calculation of the instant correction value is forbidden and therefore, the correction of the fuel injection amount for acquiring the base EGR rate by the instant correction value is forbidden. That is, the instant correction value in the formula 3 is set as "0". This has the following advantage. That is, the instant correction value has a function to remove the difference of the currently detected air-fuel ratio relative to the currently estimated air-fuel ratio. Therefore, the difference of the detected air-fuel ratio relative to the estimated air-fuel ratio becomes small by the correction of the fuel injection amount for acquiring the base EGR rate by the instant correction value (hereinafter, this correction will be simply referred to as—correction by the instant correction value—). On the other hand, in the case that the correction by the instant correction continues when the sign of the actual target EGR rate change rate is different from that of the referential target EGR rate change rate, although the air-fuel ratio of the mixture gas should be increased in order to correspond the detected air-fuel ratio to the estimated air-fuel ratio, the actual air-fuel ratio becomes small. In this case, the air-fuel ratio of the mixture gas separates from the air-fuel ratio which can obtain the expected engine property. Thus, the property of the engine largely separates from the expected engine property. On the other hand, although the air-fuel ratio of the mixture gas should be decreased in order to correspond the detected air-fuel ratio to the estimated air-fuel ratio, the actual air-fuel ratio becomes large. In this case, the air-fuel ratio of the mixture gas separates from the air-fuel ratio which can obtain the expected engine property. Thus, the property of the engine largely separates from the expected engine property. In this regard, if the correction by the instant correction value is forbidden when the sign of the actual target EGR rate change rate is different from that of the referential target EGR rate change rate, the detected air-fuel ratio does not approach the estimated air-fuel ratio, however, it is restricted that the property of the engine largely separates from the expected engine property.

Further, in the first embodiment, when the sign of the actual target EGR rate change rate is different from that of the referential target EGR rate change rate and therefore, the learning of the learned correction value is forbidden, the acquisition of the learned correction value from the map shown in FIG. 3 is forbidden and therefore, the correction of the fuel injection amount for acquiring the base EGR rate by the learned correction value is forbidden. That is, the learned correction value in the formula 3 is set as "0" and as a result, the correction coefficient calculated according to the formula 3 becomes "1" and therefore, the correction of the fuel injection amount for acquiring the base EGR rate is not substantially performed.

This has an advantage that it is surely restricted that the property of the engine largely separates from the expected engine property. That is, when the sign of the actual target EGR rate change rate is different from that of the referential target EGR rate change rate, the learned correction value which has already been learned may not be a value for correcting the fuel injection amount for acquiring the base EGR rate in a desired manner (i.e. a value for correcting the fuel injection amount for acquiring the base EGR rate such that a target EGR rate which can increase the air-fuel ratio of the mixture gas when the air-fuel ratio should be increased or a target EGR rate which can decrease the air-fuel ratio of the mixture gas when the air-fuel ratio should be decreased is set). In particular, the possibility of the occurrence thereof is high in the base that the leaning of the learned correction value is not forbidden immediately when the sign of the actual target EGR rate change rate starts to differ from that of the referential target EGR rate change rate.

However, according to the first embodiment, when the learning of the learned correction value is forbidden, the correction by the learned correction value is forbidden and therefore, it is surely restricted that the property of the engine largely separates from the expected engine property.

It should be noted that in order to restrict the large separation of the property of the engine from the expected engine property, the forbiddance of the correction of the fuel injection amount for acquiring the base EGR rate by the learned correction value when the learning of the learned correction value is forbidden is useful for the case that the learned correction value which has been already learned when the learning of the learned correction value is forbidden is not a value for correcting the fuel injection amount for acquiring the base EGR rate in a desired manner. Therefore, in consideration of the structure of the control relating to the learning of the learned correction value, it is preferred that the correction of the fuel injection amount for acquiring the base EGR rate by the learned correction value is forbidden when the learning of the learned correction value is forbidden in the case that the learned correction value which has been already learned when the learning of the learned correction value is forbidden is not a value for correcting the fuel injection amount for acquiring the base EGR rate in a desired manner. Otherwise, it is preferred that it is judged if the learned correction value which has been already learned when the learning of the learned correction value is forbidden is not a value for correcting the fuel injection amount for acquiring the base EGR rate in a desired manner and then, when it is judged that the learned correction value which has been already learned is not a value for correcting the fuel injection amount for acquiring the base EGR rate in a desired manner, the correction of the fuel injection amount for acquiring the base EGR rate by the learned correction value is forbidden when the learning of the learned correction value is forbidden.

Further, in the first embodiment, the correction coefficient is reflected in the calculation of the estimated air-fuel ratio. However, the calculation method of the estimated air-fuel ratio of the second embodiment is an example and any estimated air-fuel ratio can be employed in the first embodiment as far as the estimated air-fuel ratio has a value calculated as a value which increases or does not change or has a decrease rate smaller than that of the detected air-fuel ratio when the EGR rate becomes large and the detected air-fuel ratio becomes small and which decreases or does not change or has an increase rate larger than that of the detected air-fuel ratio when the EGR rate becomes small and the detected air-fuel ratio becomes large (i.e. a value which the detected air-fuel ratio decreasing by the increase of the EGR rate or increasing by the decrease of the EGR rate converges).

Figure 4:
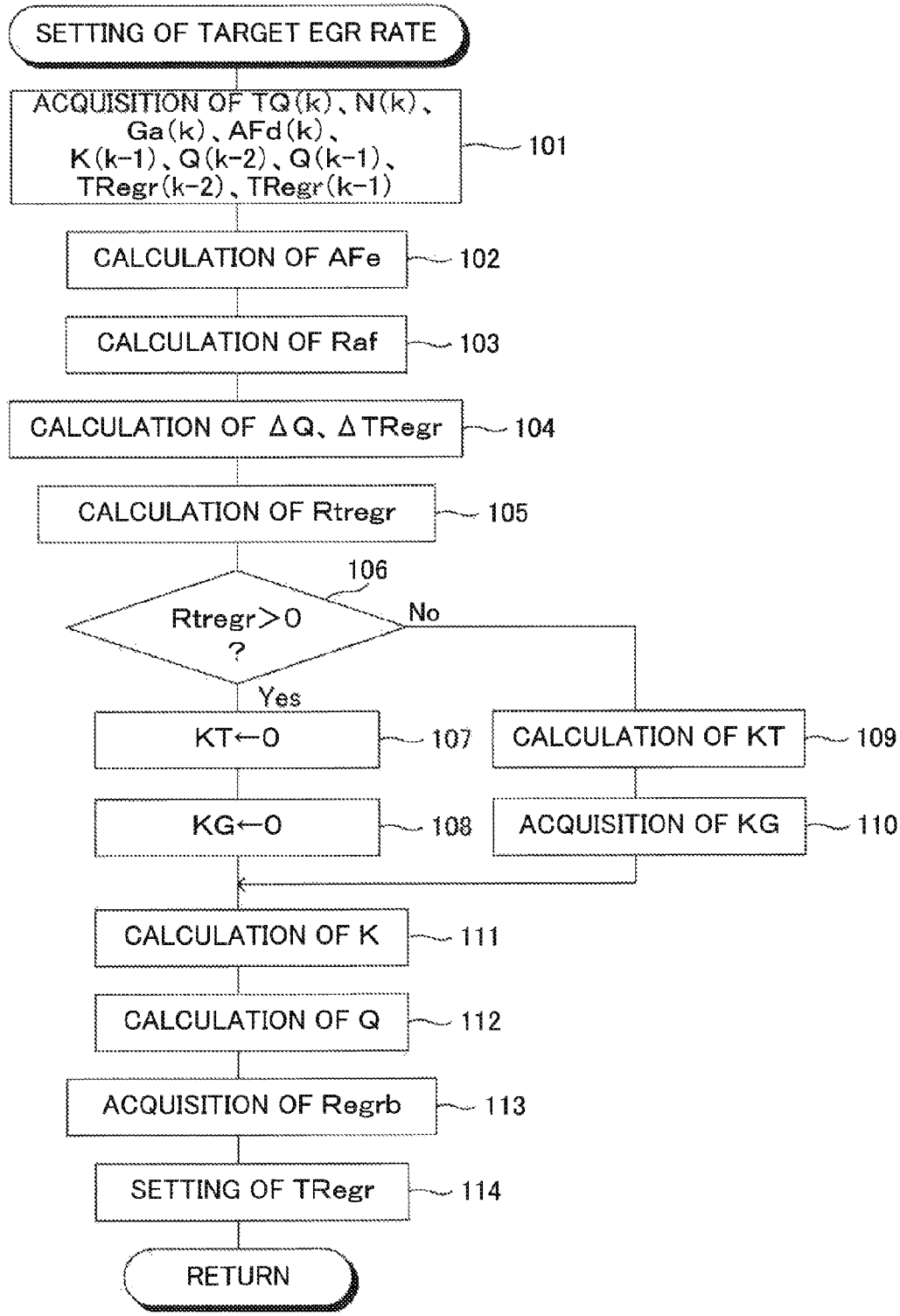
FIG. 4 is a view showing an example of a routine for performing a setting of a target EGR rate of the first embodiment.

Next, an example of a routine for performing the setting of the target EGR rate of the first embodiment will be explained. The example of this routine is shown in FIG. 4. It should be noted that the routine shown in FIG. 4 is performed every a predetermined time has been elapsed.

When the routine shown in FIG. 4 starts, at the step 101, the current target fuel injection amount TQ(k), the current engine speed N(k), the current intake air amount Ga(k), the current detected air-fuel ratio AFd(k), the correction coefficient calculated at the step 110 of the last performance of this routine (hereinafter, this correction coefficient will be referred to as—correction coefficient calculated last time—) $K(k-1)$, the fuel injection amount for acquiring the base EGR calculated at the step 11 of the performance of this routine immediately before the last performance of this routine (hereinafter, this fuel injection amount will be referred to as—fuel injection amount for acquiring the base EGR rate calculated immediately before the last time—) $Q(k-2)$, the fuel injection amount for acquiring the base EGR rate calculated at the step 111 of the last performance of this routine (hereafter, this fuel injection amount will be referred to as—fuel injection amount for acquiring the base EGR rate calculated last time) $Q(k-1)$, the target EGR rate set at the step 113 of the performance of this routine immediately before the last performance of this routine (hereinafter, this target EGR rate will be referred to as—target EGR rate immediately before the last time—) TRegr $(k-2)$ and the target EGR rate set at the step 111 of the last performance of this routine (hereinafter, this target EGR rate will be referred to as—target EGR rate last time—) are acquired.

Next, at the step 102, an estimated air-fuel ratio AFe is calculated by applying the current target fuel injection amount TQ(k), the current intake air amount Ga(k) and the correction coefficient calculated last time $K(k-1)$ acquired at the step 101 to the formula 5. Next, at the step 103, an air-fuel ratio difference ratio Raf is calculated by applying the current detected air-fuel ratio AFd acquired at the step 101 and the estimated air-fuel ratio AFe calculated at the step 102 to the formula 4. Next, a change amount $\Delta Q$ of the fuel injection amount for acquiring the base EGR rate from immediately before the last time to the last time (hereinafter, this change amount will be referred to as—change amount of the fuel injection amount for acquiring the base EGR rate—) is calculated by subtracting the fuel injection amount $Q(k-2)$ for acquiring the base EGR rate immediately before the last time acquired at the step 101 from the fuel injection amount $Q(k-1)$ for acquiring the base EGR rate last time acquired at the step 101 and a change amount $\Delta$TRegr of the target EGR rate from immediately before the last time to the last time (hereinafter, this change amount will be referred to as—target EGR rate change amount—) is calculated by subtracting the target EGR rate immediately before the last time TRegr$(k-2)$ acquired at the step 101 from the target EGR rate last time TRegr$(k-1)$ acquired at the step 101. Next, at the step 105, a target EGR rate change amount per unit fuel injection amount change for acquiring the base EGR rate (i.e. the actual target EGR rate change prediction value) Rtr $(=\Delta$TRegr$/\Delta Q)$ is calculated by dividing the target EGR rate change amount $\Delta$TRegr calculated at the step 104 by the change amount $\Delta Q$ of the fuel injection amount for acquiring the base EGR rate calculated at the step 104.

Next, at the step 106, it is judged if the actual target EGR rate change rate Rtregr calculated at the step 105 is larger than "0" (Rtrege>0). When it is judged that Rtregr>0, that is when the sign of the actual target EGR rate change rate is different from that of the referential target EGR rate change rate, the routine proceeds to the step 107. On the other hand, when it is not judged that Rtregr>0, that is, the sign of the actual target EGR rate change rate is the same as that of the referential target EGR rate change rate, the routine proceeds to the step 108.

Next, when it is judged that Rtregr>0 at the step 106 and then, the routine proceeds to the step 107, the instant correction value KT is set as "0". Next, at the step 108, the learned correction value KG is set as "0" and then, the routine proceeds to the step 111. That is, the calculation of the instant correction value KT is forbidden and the acquisition of the learned correction value KG is forbidden and therefore, the correction of the fuel injection amount for acquiring the base EGR rate by the instant correction value KT and the learned correction value KG is forbidden.

When, it is not judged that Rtregr>0 at the step 106 and then, the routine proceeds to the step 109, the instant correction value KT for correcting the fuel injection amount for acquiring the base EGR rate last time such that the air-fuel ratio difference ratio Raf calculated at the step 103 approaches "1" is calculated. Next, at the step 110, the learned correction value KG is acquired from the map shown in FIG. 3 on the basis of the current target fuel injection amount TQ(k) acquired at the step 101 and the current engine speed N(k) and then, the routine proceeds to the step 111.

At the step 111, the correction coefficient K is calculated by applying the instant correction value KT set at the step 107 or calculated at the step 109 (i.e. in the case that the routine proceeds to the step 111 via the step 107, the instant correction value KT set at the step 107 and in the case that the routine proceeds to the step 11 via the step 109, the instant correction value KT calculated at the step 109) and the learned correction value KG set at the step 108 or acquired at the step 110 (i.e. in the case that the routine proceeds to the step 111 via the step 108, the learned correction value KG set at the step 108 and in the case that the routine proceeds to the step 111 via the step 110, the learned correction value KG acquired at the step 110) to the formula 3.

Next, at the step 112, the fuel injection amount Q for acquiring the base EGR rate is calculated by applying the current target fuel injection amount TQ(k) acquired at the step 101 and the correction coefficient K calculated at the step 111 to the formula 2. Next, at the step 113, the base EGR rate Regrb is acquired from the map shown in FIG. 2(C) on the basis of the fuel injection amount Q for acquiring the base EGR rate calculated at the step 112. Next, at the step 114, the base EGR rate Regrb acquired at the step 113 is set to the target EGR rate TRegr and then, the routine is terminated.

Next, at the step 111, the fuel injection amount Q is calculated by applying the current target fuel injection amount TQ(k) acquired at the step 101 and the correction coefficient K calculated at the step 110 to the formula 2. Next, at the step 112, the base EGR rate Regrb is acquired from the map shown in FIG. 2(C) on the basis of the fuel injection amount Q for acquiring the base EGR rate calculated at the step 111. Next, at the step 113, the base EGR rate Regrb acquired at the step 112 is set to the target EGR rate TRegr and then, the routine is terminated.

Figure 5:
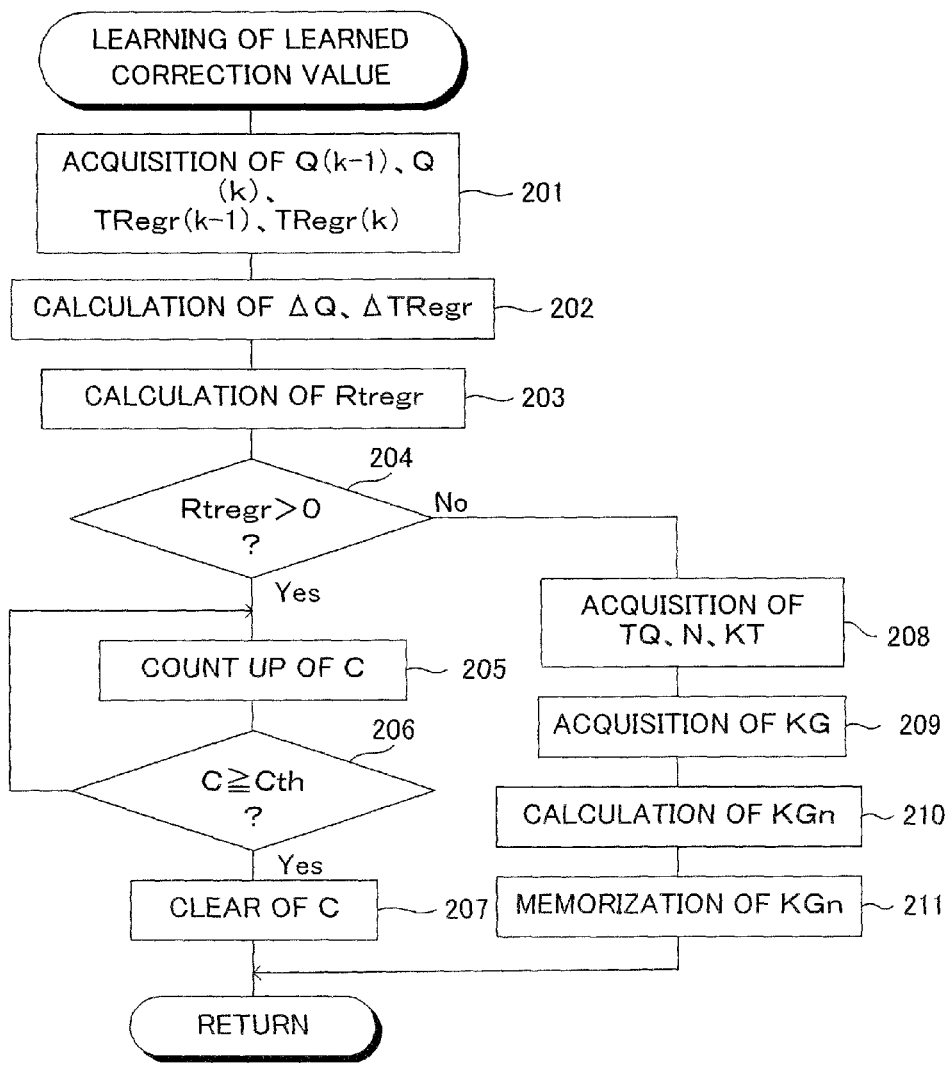
FIG. 5 is a view showing an example of a routine for performing a learning of the learned correction value of the first embodiment.

Next, an example of a routine for performing the learning of the learned correction value of the first embodiment will be explained. An example of this routine is shown in FIG. 5. It should be noted that the routine shown in FIG. 5 is performed every a predetermined time has been elapsed.

When the routine shown in FIG. 5 starts, first, at the step 201, the last time fuel injection amount Q(k−1) for acquiring the base EGR rate, the current fuel injection amount Q(k) for acquiring the base EGR rate, the last time target EGR rate TRegr(k−1) and the current target EGR rate TRegr(k) are acquired. Next, at the step 202, a change amount ΔQ from the last time fuel injection amount for acquiring the base EGR rate to the current fuel injection amount for acquiring the base EGR rate (hereinafter, this change amount will be referred to as—change amount of the fuel injection amount for acquiring the base EGR rate—) is calculated by subtracting the last time fuel injection amount Q(k−1) for acquiring the base EGR rate acquired at the step 201 from the current fuel injection amount Q(k) for acquiring the base EGR rate acquired at the step 201 and a change amount ΔTRegr from the last time target EGR rate to the current target EGR rate (hereinafter, this change amount will be referred to as—target EGR rate change amount—) is calculated by subtracting the last time target EGR rate TRegr(k−1) acquired at the step 201 from the current target EGR rate TRegr(k) acquired at the step 201. Next, at the step 203, a target EGR rate change amount per unit change amount of the fuel injection for acquiring the base EGR rate (i.e. an actual target EGR rate change rate) Rtregr(=ΔTRegr/ΔQ) is calculated by dividing the target EGR rate change amount ΔTRegr calculated at the step 202 by the change amount ΔQ of the fuel injection amount for acquiring the base EGR rate calculated at the step 202.

Next, at the step 204, it is judged if the actual target EGR rate change rate Rtregr calculated at the step 203 is larger than "0" (Rtregr>0). When it is judged that Rtregr>0, that is, the sign of the actual target EGR rate change rate is different from that of the referential target EGR rate change rate, the routine proceeds to the step 205. On the other hand, when it is judged that Rtregr>0, that is, the sign of the actual target EGR rate change rate is the same as that of the referential target EGR rate change rate, the routine proceeds to the step 208.

When it is judged that Rtregr>0 at the step 204 and then, the routine proceeds to the step 205, a counter C indicating the time elapsed from when it is judged that Rtregr>0 at the step 204 is counted up. Next, at the step 206, it is judged if the counter C counted up at the step 205 is equal to or larger than a predetermined value Cth (C≥Cth). When it is judged that C≥Cth, the routine proceeds to the step 207. On the other hand, when it is judged that C≥Cth, the routine returns to the step 205. That is, in this routine, until it is judged that C≥Cth at the step 206, the counter C is continuously counted up at the step 205 and when it is judged that C≥Cth at the step 206, the routine proceeds to the step 207. It should be noted that the predetermined value Cth is set as a value corresponding to the sufficient time such that the actual target EGR rate change rate Rtregr becomes larger than "0" from when it is judged that the actual target EGR rate change rate Rtregr is not larger than "0" at the step 204.

When it is judged that C≥Cth at the step 206 and then, the routine proceeds to the step 207, the counter C is cleared and then, the routine is terminated. It should be noted that in this routine, from when it is judged that Rtregr>0 at the step 204 to when the routine is terminated, the learning of the learned correction value is not performed (that is, the learning of the learned correction value is forbidden).

When it is judged that Rtregr>0 at the step 204 and then, the routine proceeds to the step 208, the current target fuel injection amount TQ, the current engine speed N and the latest instant correction value KT are acquired. Next, at the step 209, the learned correction value KG corresponding to the target fuel injection amount TQ and the engine speed N acquired at the step 208 is acquired from the map shown in FIG. 3. Next, at the step 210, a new learned correction amount KGn is calculated according to the formula 6. Next, at the step 211, the KGn calculated at the step 210 is memorized in the electronic control unit by replacing the learned correction value KG of the map shown in FIG. 3 corresponding to the target fuel injection amount TQ and the engine speed N acquired at the step 208 with the KGn calculated at the step 210 and then, the routine is terminated. It should be noted that the calculation of a new learned correction value KGn at the step 210 and the memorizing of the new learned correction value KGn at the step 211 correspond to the learning of the learned correction value.

In the first embodiment, when the learning of the learned correction value is forbidden, the correction of the fuel injection amount for acquiring the base EGR rate by the learned correction value is also forbidden. However, when the learning of the learned correction value is forbidden, the correction of the fuel injection amount for acquiring the base EGR rate by the learned correction value which has been already learned may be performed. Next, this embodiment (hereinafter, this embodiment will be referred to as—second embodiment—) will be explained. It should be noted that the constitution of the second embodiment which will not be explained below is the same as that of the first embodiment or is that obviously understood from the first embodiment in consideration of the constitution of the second embodiment.

Figure 7:
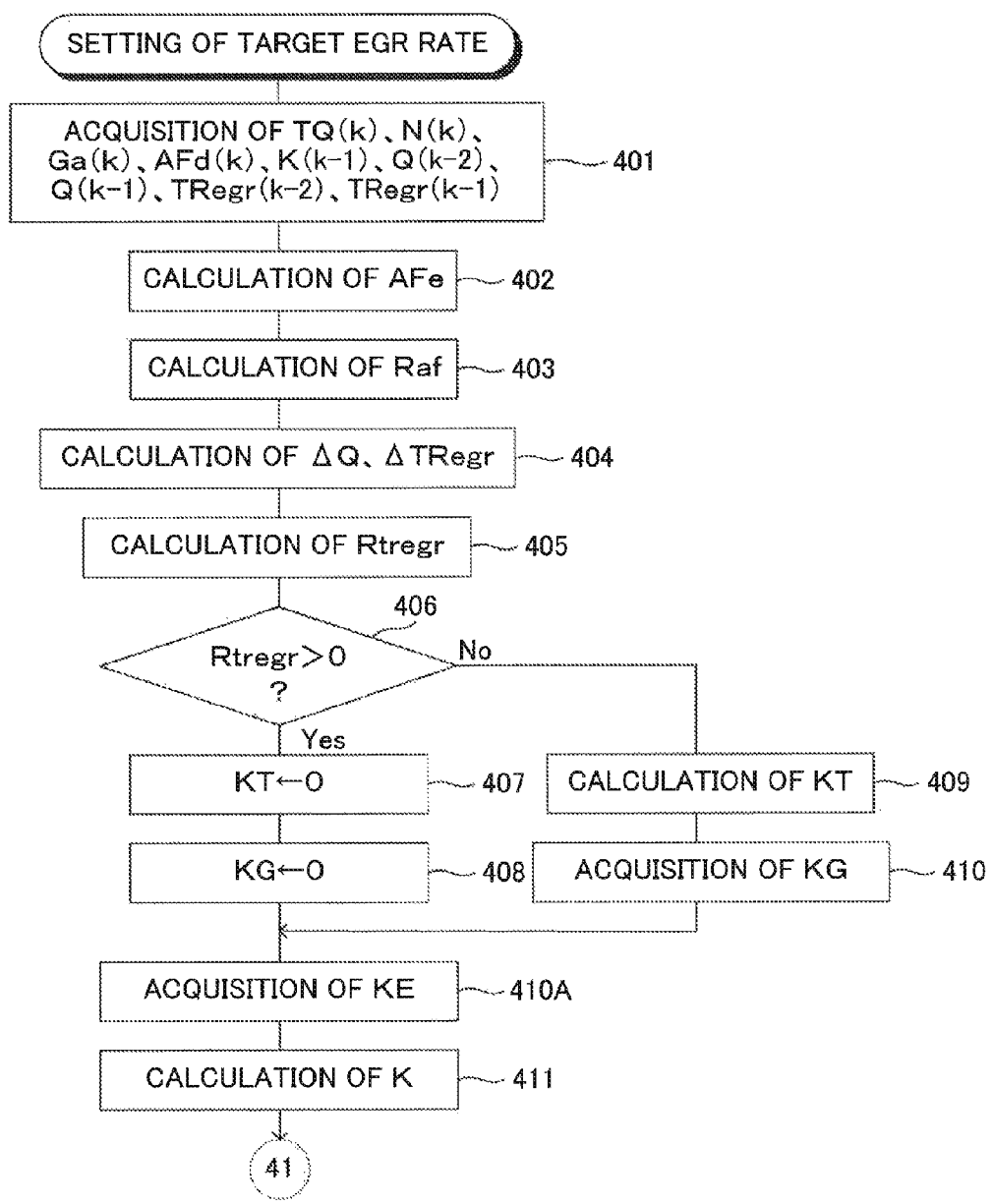
FIG. 7 is a view showing a part of an example of a routine for performing a setting of a target EGR rate of a third embodiment.

In the second embodiment, the correction coefficient calculated according to the formula 3 is divided depending on the rate between the stationary operation property differences of the fuel injector and the air flow meter and therefore, a correction coefficient corresponding to the stationary operation property difference of the fuel injector (hereinafter, this correction coefficient will be referred to as—fuel injection amount correction coefficient—) and a correction coefficient corresponding to the stationary operation property difference of the air flow meter (hereinafter, this correction coefficient will be referred to as—intake air correction coefficient—) are calculated. Then, as shown in FIG. 7, the estimated air-fuel ratio AFe used in the formula 4 is obtained by dividing a value obtained by multiplying the intake air amount Ga by the intake air amount correction coefficient KA by a value obtained by multiplying the target fuel injection amount TQ by the fuel injection amount correction coefficient KQ.

$$AFe=(Ga \times KA)/(TQ \times KQ) \qquad (7)$$

Further, in the second embodiment, as shown in the following formula 8, the actual EGR rate Regr is obtained by dividing a value which is obtained by subtracting a value obtained by multiplying the amount Ga of the air supplied to the combustion chamber in one intake stroke (i.e. the intake air amount) by the intake air amount correction coefficient KA, by a total amount Gc of the gas sucked into the combustion chamber in one intake stroke.

$$Regr=(Gc-Ga \times KA)/Gc \qquad (8)$$

Further, in the second embodiment, when the sign of the actual target EGR rate change rate is different from that of the referential target EGR rate change rate and therefore, the learning of the learned correction value, the learned correction value KG is acquired from the map shown in FIG. 3 depending on the current target fuel injection amount TQ and the current engine speed N. Then, the correction coefficient is calculated according to the formula 3 using this acquired learned correction value. Then, the target fuel injection amount corrected by this calculated correction coefficient is used as the fuel injection amount for acquiring the base EGR rate. That is, in the second embodiment, when the learning of the learned correction value is forbidden, the fuel injection amount for acquiring the base EGR rate is corrected using the learned correction value which has already been learned.

There is an advantage that the large separation of the property of the engine from the expected engine property can be surely restricted if the correction of the fuel injection amount for acquiring the base EGR rate by the learned correction value which has been already learned when the learning of the learned correction value is forbidden as explained above. That is, in order to calculate on the basis of the target fuel injection amount a command signal to be supplied to the fuel injector for making the fuel injector inject the fuel having the target fuel injection amount, a relationship between the target fuel injection amount and the command signal (for example, a conversion rule for converting the target fuel injection amount to the command signal) is previously obtained and then, during the engine operation, a command signal is calculated on the basis of the target fuel injection amount using this relationship and then, this command signal is supplied to the fuel injector. In this regard, when the operation property of the fuel injector used for obtaining the above-mentioned relationship is referred to as—expected operation property—, if the operation property of the fuel injector is the expected operation property, the fuel injection amount must correspond to the target fuel injection amount by supplying the command signal calculated on the basis of the target fuel injection amount using the above-mentioned relationship to the fuel injector. However, in fact, the operation property of the fuel injector differs every the fuel injector and therefore, the operation property of the fuel injector may be different from the expected operation property. In this case, even if the command signal calculated using the above-mentioned relationship is supplied to the fuel injector, the fuel injection does not correspond to the target fuel injection amount. Further, the fuel injector deteriorates due to the long usage thereof and then, the operation property thereof may differ from the expected operation property. Also, in this case, even if the command signal calculated using the above-mentioned relationship is supplied to the fuel injector, the fuel injection amount does not correspond to the target fuel injection amount. Under the circumstances, it can be said that the stationary difference of the operation property of the fuel injector relative to the expected operation property (hereinafter, this difference will be referred to as—stationary operation property difference of the fuel injector—) occurs.

Further, in order to calculate the intake air amount on the basis of the output value of the air flow meter, a relationship between the output value of the air flow meter and the intake air amount (for example, a conversion rule for converting the output value of the air flow meter to the intake air amount) is previously obtained and then, during the engine operation, the intake air amount is calculated on the basis of the output value of the air flow meter using this relationship. In this regard, when the operation property of the air flow meter used for obtaining the above-mentioned relationship is referred to as—expected operation property—, if the operation property of the air flow meter is the expected operation property, the intake air amount calculated using the above-mentioned relationship must correspond to the actual intake air amount. However, in fact, the operation property of the air flow meter differs every the air flow meter and therefore, the operation property of the air flow meter may be different from the expected operation property. In this case, the intake air amount calculated using the above-mentioned relationship does not correspond to the actual intake air amount. Further, the air flow meter deteriorates due to the long usage thereof and therefore, the operation property thereof may differ from the expected operation property. Also, in this case, the intake air amount calculated using the above-mentioned relationship does not correspond to the actual intake air amount. Under the circumstances, it can be said that the stationary difference of the operation property of the air flow meter relative to the expected operation property (hereinafter, this difference will be referred to as—stationary operation property difference of the air flow meter—) occurs.

Then, the difference of the detected air-fuel ratio (i.e. the air-fuel ratio of the mixture gas) relative to the estimated air-fuel ratio (hereinafter, this difference will be referred to as—air-fuel ratio difference—) includes an air-fuel ratio difference (hereinafter, this difference will be referred to as stationary air-fuel ratio difference) due to the stationary operation property differences of the fuel injector and the air flow meter and it can be said that almost the air-fuel ratio difference when the engine operation condition is the stationary condition is the stationary air-fuel ratio difference.

On the other hand, the instant correction value is continuously calculated on the basis of the air-fuel ratio difference and then, this instant correction value reflects on the newly calculated learned correction value. Therefore, the learned correction value has a function for removing the stationary air-fuel ration difference. Then, the learned correction value learned when the sign of the actual target EGR rate change rate is the same as that of the referential target EGR rate change rate is a value for appropriately removing the stationary air-fuel ratio difference. Therefore, if the correction of the fuel injection amount for acquiring the base EGR rate by the learned correction value which has been already learned (hereinafter, this correction will be referred to as—correction by the learned correction value—) is performed when the learning of the learned correction value is forbidden, at least a part of the stationary air-fuel ratio difference is removed. In particular, in the case that the learning of the learned correction value is forbidden immediately when the sign of the actual target EGR rate change rate starts differing from that of the referential target EGR rate change rate, there is a high possibility that at least a part of the stationary air-fuel ratio difference is removed by the correction by the learned correction value which has been already learned and in the case that the learning of the learned correction value has progressed sufficiently such that almost the stationary air-fuel ratio difference can be removed, almost the stationary air-fuel ratio difference is removed by the correction by the learned correction value which has been already learned.

According to the second embodiment, even if the learning of the learned correction value is forbidden, the correction by the learned correction value which has been already learned continues and therefore, the large separation of the property of the engine from the expected engine property is further surely restricted.

It should be noted that in order to restrict the large separation of the property of the engine from the expected engine property, the correction by the learned correction value which has been already learned when the learning of the learned correction value is forbidden is useful in the case that the current learning of the learned correction value has progressed sufficiently such that almost the stationary air-fuel ratio difference can be removed. Therefore, in the view point of the structure of the control relating to the learning of the learned correction value, it is preferred that the correction by the learned correction value which has been already learned is employed in the case that there is a high possibility that the learning of the learned correction value has progressed sufficiently when the learning of the learned correction value is forbidden. Otherwise, it is preferred that it is judged that the learning of the learned correction value has progressed sufficiently when the learning of the learned correction value is forbidden and then, when it is judged that the learning of the learned correction value has progressed sufficiently, the correction by the learned correction value which has been learned is performed.

Figure 6:
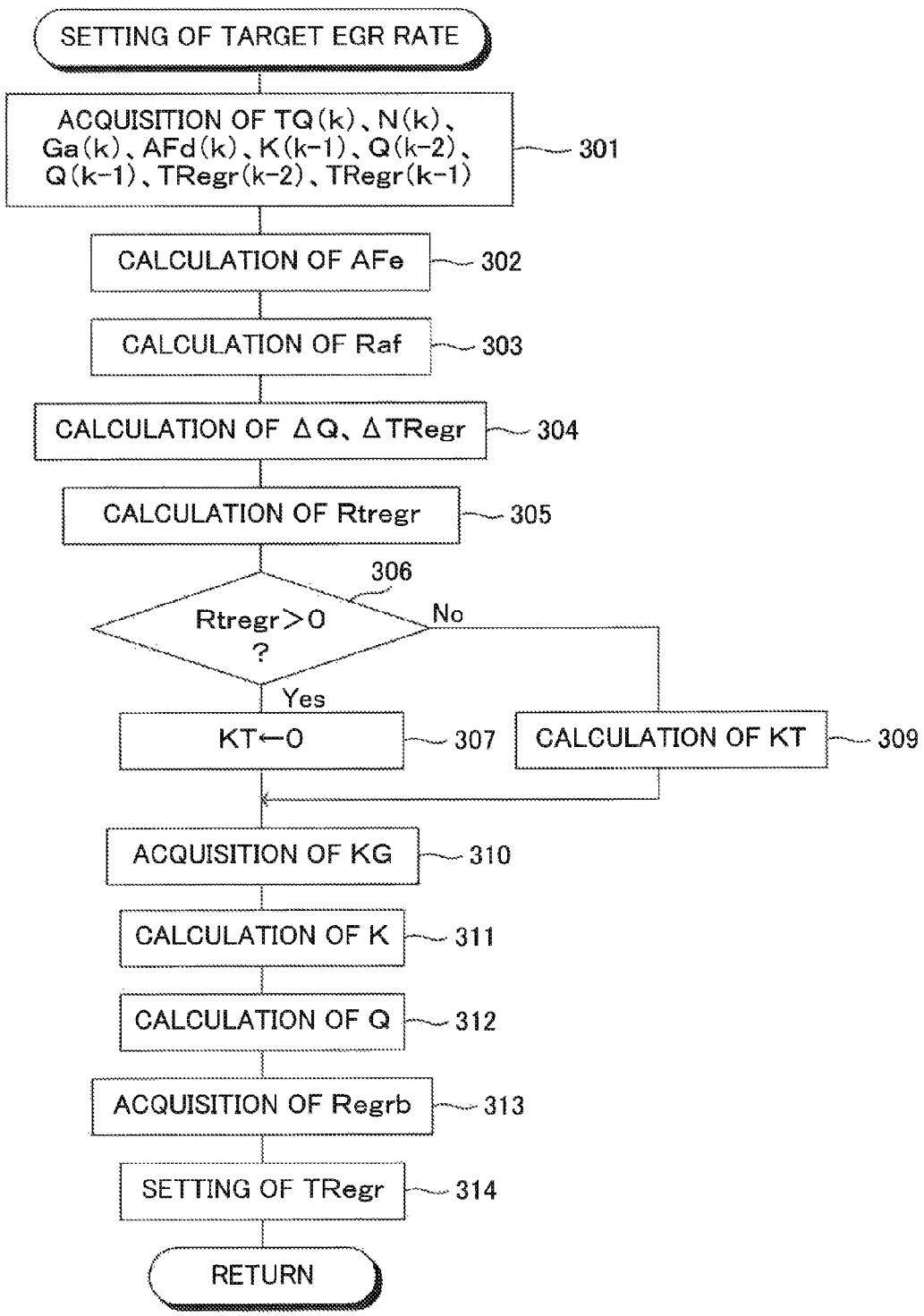
FIG. 6 is a view showing an example of a routine for performing the setting of a target EGR rate of a second embodiment.

Next, an example of a routine for performing the setting of the target EGR rate of the second embodiment will be explained. An example of this routine is shown in FIG. 6. It should be noted that the routine shown in FIG. 6 is performed every a predetermined time has been elapsed. Further, the steps 301-305 shown in FIG. 6 are the same as the steps 101-105, respectively and therefore, the explanations thereof will be omitted.

At the step 306, it is judged if the actual target EGR rate change rate Rtregr calculated at the step 305 is larger than "0" (Rtregr>0). When it is judged that Rtregr>0, that is, the sign of the actual target EGR rate change rate is different from that of the referential target EGR rate change rate, the routine proceeds to the step 307. On the other hand, when it is not judged that Rtregr>0, that is, the sign of the actual target EGR rate change rate is the same as that of the referential target EGR rate change rate, the routine proceeds to the step 309.

When it is judged that Rtregr>0 at the step 306 and then, the routine proceeds to the step 307, the instant correction value KT is set as "0" and then, the routine proceeds to the step 310. That is, the calculation of the instant correction value KT is forbidden and therefore, the correction of the fuel injection amount for acquiring the base EGR rate by the instant correction value KT is forbidden.

When it is judged that Rtregr>0 at the step 306 and then, the routine proceeds to the step 309, the instant correction value KT is calculated for correcting the fuel injection amount for acquiring the last time base EGR rate such that the air-fuel ratio difference ratio Raf calculated at the step 303 approaches to "1" and then, the routine proceeds to the step 310.

At the step 310, the learned correction value KG is acquired from the map shown in FIG. 3 on the basis of the current target fuel injection amount TQ(k) and the current engine speed N(k) acquired at the step 301. Next, at the step 311, the correction coefficient K is calculated by applying the instant correction value KT set at the step 307 or calculated at the step 309 (that is, the instant correction value KT set at the step 307 in the case that the routine proceeds to the step 310 via the step 307 and the instant correction value KT calculated at the step 309 in the case that the routine proceeds to the step 310 via the step 309) and the learned correction value KG acquired at the step 310 to the formula 3.

Next, at the step 312, the fuel injection amount Q for acquiring the base EGR rate is calculated by applying the current target fuel injection amount TQ(k) acquired at the step 301 and the correction coefficient K calculated at the step 311 to the formula 2. Next, at the step 313, the base EGR rate Regrb is acquired from the map shown in FIG. 2(C) on the basis of the fuel injection amount Q for acquiring the base EGR rate calculated at the step 312. Next, at the step 314, the base EGR rate Regrb acquired at the step 313 is set to the target EGr rate TRegr and then, the routine is terminated.

In the first embodiment, the correction of the fuel injection amount for acquiring the base EGR rate by a correction value calculated depending on the value of the environmental parameter may be performed. Next, an embodiment for performing the correction of the fuel injection amount for acquiring the base EGR rate by a correction value calculated depending on the value of the environmental parameter (hereinafter, this embodiment will be referred to as—third embodiment—) will be explained. It should be noted that the constitution of the third embodiment which will not be explained is the same as that of the above-explained embodiments or that obviously estimated from the above-explained embodiments.

In the third embodiment, a correction value for correcting the fuel injection amount for acquiring the base EGR rate so as to accomplish the expected engine property is calculated depending on the value of the environmental parameter (hereinafter, this correction value will be referred to as—environmental correction value—), the fuel injection amount for acquiring the base EGR rate is corrected by this calculated environmental correction value, the base EGR rate is acquired from the map shown in FIG. 2(C) using this corrected fuel injection amount for acquiring the base EGR rate and this acquired base EGR rate is set to the target EGR rate.

It should be noted that as the method of the correction of the fuel injection amount for acquiring the base EGR rate by the environmental correction value, there are various methods and for example, there is a method for calculating the correction coefficient by adding the instant correction value, the learned correction value multiplied by the environmental correction value and "1" together as shown in the following formula 9, setting the fuel injection amount obtained by multiplying the target fuel injection amount by this calculated correction coefficient as shown in the following formula 10 to the fuel injection amount for acquiring the base EGR rate and setting the current engine speed to the engine speed for acquiring the base EGR rate to acquire the base EGR rate from the map shown in FIG. 2(C) and setting this acquired base EGR rate to the target EGR rate. It should be noted that in the formulas 9 and 10, "K" is the correction coefficient, "KT" is the instant correction value, "KG" is the learned correction value, "KE" is the environmental correction value, "Q" is the fuel injection amount for acquiring the base EGR rate and "TQ" is the target fuel injection amount.

$$K=KT+KG \times KE+1 \quad (9)$$

$$Q=TQ \times K \quad (10)$$

Further, there is various correction values as the environmental correction value and for example, the environmental correction value calculated as follows can be employed. That is, during the engine operation, when the map shown in FIG. 2(C) is corrected by the environmental correction value, the actual and referential target EGR rate change rates are calculated. Then, a ratio of the referential target EGR rate change rate relative to the actual target EGR rate change rate is calculated (hereinafter, this ratio will be referred to as—target EGR rate change rate ratio—). Then, when the target EGR rate change rate ratio is equal to or larger than "1", "1" is employed as the environmental correction value and then, the correction coefficient is calculated according to the formula 9. That is, in this case, substantially, the correction of the fuel injection amount for acquiring the base EGR rate by the environmental correction value is not performed. On the other hand, when the target EGR rate change rate ratio is smaller than "1", the target EGR rate change rate ratio is employed as the environmental correction value and then, the correction coefficient is calculated according to the formula 9.

The third embodiment has an advantage that the excess correction of the fuel injection amount for acquiring the base EGR rate by the learned correction value, furthermore, the excess correction of the base EGR rate by the learned correction value, furthermore, the excess correction of the target EGR rate by the learned correction value can be restricted. That is, the matter that the target EGR rate change rate ratio is smaller than "1" means that the change amount of the base EGR rate per unit change amount of the fuel injection amount for acquiring the base EGR rate in the map shown in FIG. 2(C) corrected by the environmental correction value is larger than that in the map shown in FIG. 2(C) not corrected by the environmental correction value. In this case, if the correction of the fuel injection amount for acquiring the base EGR rate using the learned correction value itself acquired from the map shown in FIG. 3 is performed, there is a possibility that the fuel injection amount for acquiring the base EGR rate is excessively corrected. In this regard, the excess correction means a correction which cannot adequately converge the air-fuel ratio to the estimated air-fuel ratio in the case that the target EGR rate is set on the basis of the base EGR rate acquired from the map shown in FIG. 2(C) using the fuel injection amount for acquiring the base EGR rate corrected by the excess correction and the EGR rate is controlled according to this set target EGR rate. Then, the matter that the fuel injection amount for acquiring the base EGR rate is excessively corrected means that the base EGR rate is excessively corrected, furthermore, the target EGR rate is excessively corrected.

However, in the third embodiment, when the target EGR rate change rate ratio is smaller than "1", the learned correction value is multiplied by the target EGR rate change rate ratio. Then, since the target EGR rate change rate ratio multiplying the learned correction value is smaller than "1", the learned correction value multiplied by the target EGR rate change rate ratio becomes smaller than the learned correction value not multiplied by the target EGR rate change rate ratio. Thus, the degree of the correction of the fuel injection amount for acquiring the base EGR rate by the learned correction value becomes smaller than that of the correction of the fuel injection amount for acquiring the base EGR rate by the learned correction value not multiplied by the target EGR rate change rate ratio. Therefore, the excess correction of the fuel injection amount for acquiring the base EGR rate by the learned correction value is restricted, furthermore, the excess correction of the base EGR rate by the learned correction value, furthermore, the excess correction of the target EGR rate by the learned correction value is restricted.

It should be noted that in the third embodiment, when the sign of the actual target EGR rate change rate is different from that of the referential target EGR rate change rate, the target EGR rate change rate ratio is a negative value.

In this regard, in the third embodiment, when the sign of the actual target EGR rate change rate is different from that of the referential target EGR rate change rate, the learning of the learned correction value is forbidden and at this time, similar to the first embodiment, in the case that the correction of the fuel injection amount for acquiring the base EGR rate by the learned correction value which has been already learned, the correction coefficient calculated according to the formula 9 may be a negative value depending on the value of the target EGR rate change rate ratio. Then, in this case, the fuel injection amount for acquiring the base EGR rate calculated according to the formula 10 becomes a negative value. However, the fuel injection amount cannot be a negative value and therefore, no base EGR rate corresponding to the fuel injection amount having a negative value is prepared in the map shown in FIG. 2(C). That is, no base EGR rate can be acquired from the map shown in FIG. 2(C) on the basis of the fuel injection amount having a negative value.

In the third embodiment, in the case that the correction of the fuel injection amount for acquiring the base EGR rate by the learned correction value which has been already learned when the learning of the learned correction value is forbidden is performed, a value larger than "0" and smaller than "1" is previously set as a lower limit value of the correction coefficient and then, when the correction coefficient calculated according to the formula 9 is smaller than the lower limit value, the lower limit value is preferably set to the correction coefficient (that is, the correction coefficient is preferably limited to the lower limit value).

On the other hand, in the third embodiment, when the learning of the learned correction value is forbidden, similar to the second embodiment, in the case that the correction of the fuel injection amount for acquiring the base EGR rate by the learned correction value is also forbidden, the learned correction value in the formula 9 is set as "0". Thus, even if the target EGR rate change rate ratio is a negative value, the correction coefficient calculated according to the formula 9 does not becomes a negative value.

Therefore, in the third embodiment, in the case that when the learning of the learned correction value is forbidden, the correction of the fuel injection amount for acquiring the EGR rate by the learned correction value is also forbidden, it is unnecessary to perform any particular processing relative to the correction coefficient calculated according to the formula 9.

Figure 8:
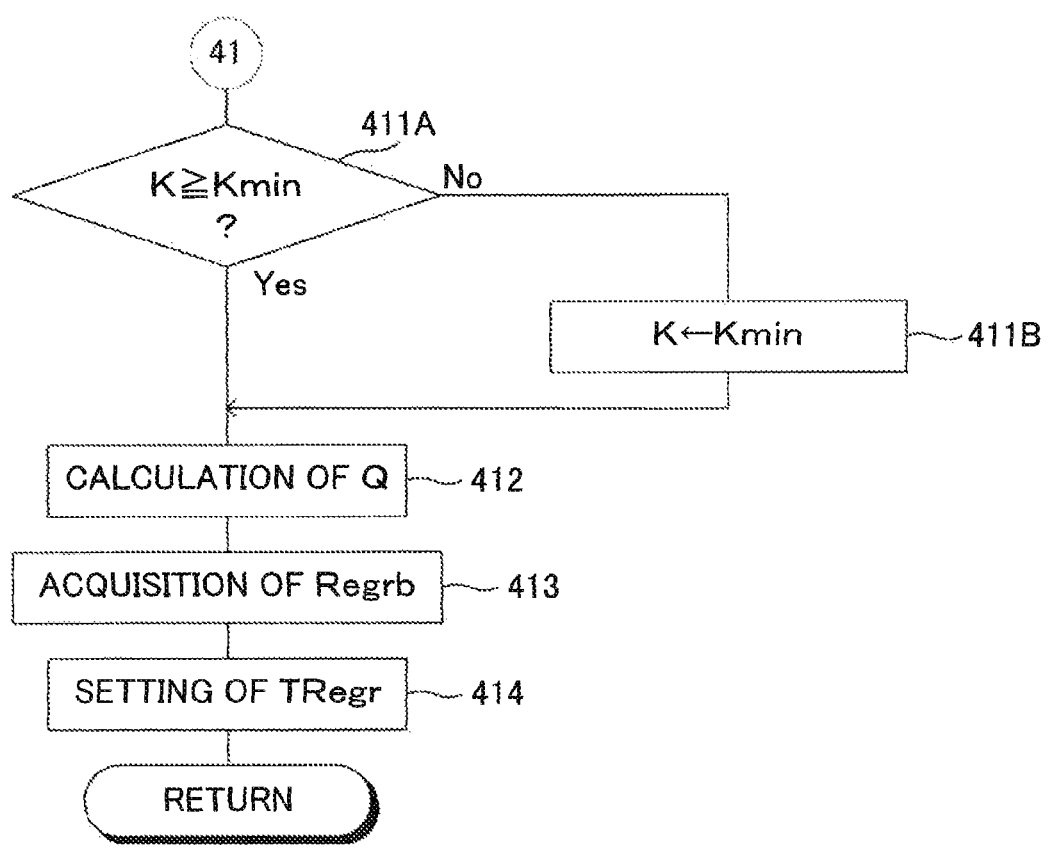
FIG. 8 is a view showing the remaining of the example of the routine for performing the setting of the target EGR rate of the third embodiment.

Next, an example of a routine for performing the setting of the target EGR rate of the third embodiment will be explained. An example of this routine is shown in FIGS. 7 and 8. It should be noted that the routine shown in FIGS. 7 and 8 is performed every a predetermined time has been elapsed. Further, the steps 401-410 shown in FIGS. 7 and 8 are the same as the step 101-110 shown in FIG. 4, respectively and therefore, the explanations thereof will be omitted.

At the step 410A shown in FIG. 7, the latest environmental correction value KE set by the routine shown in FIG. 9 explained below is acquired. Next, at the step 411, the correction coefficient K is calculated by applying to the formula 9 the instant correction value KT set at the step 407 or calculated at the step 409 (i.e. the instant correction value KT set at the step 407 in the case that the routine proceeds to the step 411 via the step 407 and the instant correction value KT calculated at the step 409 in the case that the routine proceeds to the step 411 via the step 409), the learned correction value KG set at the step 408 or acquired at the step 410 (i.e. the learned correction value KG set at the step 408 in the case that the routine proceeds to the step 411 vial the step 408 and the learned correction value KG acquired at the step 410 in the case that the routine proceeds to the step 411 via the step 410) and the environmental correction value KE acquired at the step 410A.

Next, at the step 411A shown in FIG. 8, it is judged that the correction coefficient K calculated at the step 411 is equal to or larger than the its lower limit value Kmin (K≥Kmin). When it is judged that K≥Kmin, the routine proceeds directly to the step 412. On the other hand, when it is not judged that K≥Kmin, the routine proceeds to the step 411B.

When it is judged that K≥Kmin at the step 411A and then, the routine proceeds to the step 411B, the lower limit value Kmin is set to the correction coefficient K and then, the routine proceeds to the step 412.

At the step 412, the fuel injection amount Q for acquiring the base EGR rate is calculated by applying to the formula 10 the current target fuel injection amount TQ(k) acquired at the step 401 and the correction coefficient K calculated at the step 411 or set at the step 411B (i.e. the correction coefficient K calculated at the step 411 in the case that the routine proceeds from the step 411A directly to the step 412 and the correction coefficient K set at the step 411B in the case that the routine proceeds to the step 412 via the step 411B). Next, at the step 413, the base EGR rate Regrb is acquired from the map shown in FIG. 2(C) on the basis of the fuel injection amount Q for acquiring the base EGR rate calculated at the step 412. Next, at the step 414, the base EGR rate Regrb acquired at the step 413 is set to the target EGR rate TRegr and then, the routine is terminated.

Next, an example of a routine for performing the calculation of the environmental correction value of the third embodiment will be explained. An example of this routine is shown in FIG. 9. It should be noted that the routine shown in FIG. 9 is performed every a predetermined time has been elapsed.

Figure 9:
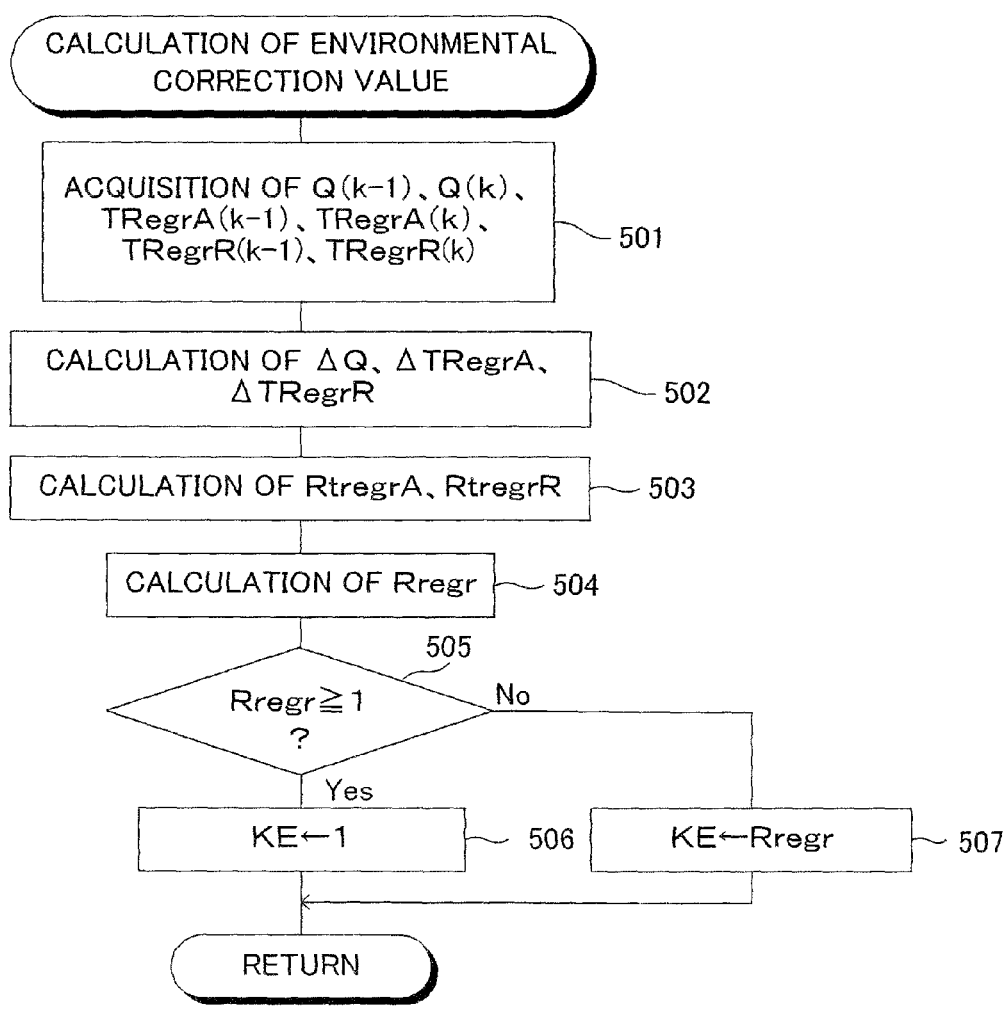
FIG. 9 is a view showing an example of a routine for performing a calculation of an environmental correction value of the third embodiment.

When the routine shown in FIG. 9 starts, first, at the step 501, the last time fuel injection amount Q(k−1) for acquiring the base EGR rate, the current fuel injection amount Q(k) for acquiring the base EGR rate, the last time target EGR rate TRegrA(k−1), the current target EGR rate TRegrA(k), the last time referential target EGR rate (i.e. the referential target EGR rate at the last time performance of this routine) TRegrR(k−1) and the current referential target EGR rate (i.e. the referential target EGR rate at this time performance of this routine) TRegrR(k) are acquired.

Next, at the step 502, a change amount from the last time fuel injection amount for acquiring the base EGR rate to the current fuel injection amount for acquiring the base EGR rate (hereinafter, this change amount will be referred to as—change amount of the fuel injection amount for acquiring the base EGR rate—) ΔQ is calculated by subtracting the last time fuel injection amount Q(k−1) for acquiring the base EGR rate acquired at the step 501 from the current fuel injection amount Q(k−1) for acquiring the base EGR rate acquired at the step 510, a change amount from the last time target EGR rate to the current target EGR rate (hereinafter, this change amount will be referred to as—actual target EGR rate change amount—) ΔTRegr is calculated by subtracting the last time target EGR rate TRegrA(k−1) acquired at the step 501 from the current target EGR rate TRegrA(k) acquired at the step 501 and a change amount from the last time referential target EGR rate to the current referential target EGR rate (hereinafter, this change amount will be referred to as—referential target EGR rate change amount—) ΔTRegrR is calculated by subtracting the last time referential target EGR rate TRegrR(k−1) acquired at the step 501 from the current referential target EGR rate TRegrR(k) acquired at the step 501.

Next, at the step 503, an actual target EGR rate change rate per unit change amount of fuel injection amount for acquiring the base EGR rate (i.e. actual target EGR rate change rate) RtregrA(=ΔTRegrA/ΔQ) is calculated by dividing the actual target EGR rate change amount ΔTRegrA calculated at the step 502 by the change amount ΔQ of the fuel injection amount for acquiring the base EGR rate calculated at the step 502 and a referential target EGR rate change amount per unit change amount of the fuel injection amount for acquiring the base EGR rate (i.e. referential target EGR rate change rate) RtregrR(=ΔTRegrR/ΔQ) is calculated by dividing the referential target EGR rate change amount ΔTRegrR calculated at the step 502 by the change amount ΔQ of the fuel injection amount for acquiring the base EGR rate calculated at the step 502.

Next, at the step 504, a target EGR rate change rate ratio Rregr is calculated by dividing the actual target EGR rate change rate RtregrA calculated at the step 503 by the referential target EGR rate change rate RtregrR calculated at the step 503. Next, at the step 503, it is judged if the target EGR rate change rate ratio Rregr calculated at the step 504 is equal to or larger than "1" (Rregr≥1). When it is judged that Rregr≥1, the routine proceeds to the step 506. On the other hand, when it is not judged that Rregr≥1, the routine proceeds to the step 507.

When it is judged that Rregr≥1 at the step 505 and then, the routine proceeds to the step 506, the environmental correction value KE is set as "1" and then, the routine is terminated. That is, in this case, substantially, the correction of the learned correction value KG by the environmental correction value KE is not performed.

When it is not judged that Rregr≥1 at the step 505 and then, the routine proceeds to the step 507, the environmental correction value KE is set as the target EGR rate change rate ratio Rregr and then, the routine is terminated. In this case, the correction of the learned correction value KG by the environmental correction value KE is performed.

The first embodiment is that obtained by applying this invention to the case that the environmental correction is performed. However, this invention can be broadly applied to the case that the map shown in FIG. 2(C) is corrected regardless of the air-fuel ratio difference ratio. In this regard, as the case that the map shown in FIG. 2(C) is corrected regardless of the air-fuel ratio difference ratio, for example, there is a case that the map shown in FIG. 2(C) is corrected depending on the transient change of the engine operation condition such that the EGR rate becomes an optimum EGR rate for obtaining the expected engine property. Next, an embodiment of this case (hereinafter, this embodiment will be explained as to—fourth embodiment—) will be explained. It should be noted that the constitution of the fourth embodiment which will not be explained below is the same as that of the above-explained embodiments or is that obviously expected from the above-explained embodiments in consideration of the constitution of the fourth embodiment.

As explained above, the map shown in FIG. 2(C) is formed assuming that the engine operation condition is the stationary operation condition. That is, the map shown in FIG. 2(C) is a map formed without considering the transient change of the engine operation condition. Therefore, in order to accomplish the expected engine property (for example, expected exhaust emission property, etc.) when the engine operation condition is a condition that the engine operation condition changes transiently (hereinafter, this condition will be referred to as—transient condition—), it is necessary to correct the EGR rate depending on the transient change of the engine operation condition such that the expected engine property can be obtained. In the fourth embodiment, a correction for correcting the map shown in FIG. 2(C) depending on the transient change of the engine operation condition such that the expected engine property can be accomplished (hereinafter, this correction will be referred to as—transient correction—) is performed. According to this, as a result, the base EGR rate is corrected by the transient correction and furthermore, the target EGR rate is corrected. Then, the expected engine property is accomplished by acquiring the base EGR rate from the map shown in FIG. 2(C) corrected by the transient correction using the target fuel injection amount corrected by the correction coefficient as the fuel injection amount for acquiring the base EGR rate, setting this base EGR rate to the target EGR rate and controlling the operation condition of the EGR control valve according to this target EGR rate.

Then, the transient correction is a correction performed regardless of the air-fuel ratio difference ratio and therefore, in the map shown in FIG. 2(C) not corrected by the transient correction, as the fuel injection amount for acquiring the base EGR rate becomes large, the base EGR rate becomes small, while in the map shown in FIG. 2(C) corrected by the transient correction, within at least a part of the area of the map, as the fuel injection amount for acquiring the base EGR rate becomes large, the base EGR rate may become large. That is, when the base EGR rate acquired from the map shown in FIG. 2(C) not corrected by the transient correction is referred to as—reference base EGR rate—and the target EGR rate set on the basis of the reference base EGR rate is referred to as—referential target EGR rate—, in the case that the base EGR rate is acquired from the map shown in FIG. 2(C) corrected by the transient correction, the sign of the ratio of the change amount of the actually acquired base EGR rate relative to the change amount of the fuel injection amount for acquiring the base EGR rate, furthermore, the sign of the ratio of the change amount of the target EGR rate relative to the change amount of the fuel injection amount for acquiring the base EGR rate (i.e. the change amount of the target EGR rate set on the basis of the base EGR rate acquired from the map shown in FIG. 2(C) corrected by the transient correction) (hereinafter, this ratio will be referred to as—actual target EGR rate change rate—) may be different from the ratio of the change amount of the reference base EGR rate relative to the change amount of the fuel injection amount for acquiring the base EGR rate, furthermore, the ratio of the change amount of the referential target EGR rate relative to the change amount of the fuel injection amount for acquiring the base EGR rate (hereinafter, this ratio will be referred to as—referential target EGR rate change rate—).

In the fourth embodiment, when the sign of the actual target EGR rate change rate is the same as that of the referential target EGR rate change rate, the above-explained learning of the learned correction value and on the other hand, when the sign of the actual target EGR rate change rate is different from that of the referential target EGR rate change rate, the above-explained learning of the learned correction value is forbidden.

The fourth embodiment has an advantage that the large separation of the property of the engine from the expected engine property can be restricted. That is, in the case that when the sign of the actual target EGR rate change rate is different from that of the referential target EGR rate change rate, the learning of the learned correction value continues and then, the correction of the fuel injection amount for acquiring the base EGR rate by the newly memorized learned correction value continues, the actual air-fuel ratio decreases even when the air-fuel ratio of the mixture gas should be increased in order to conform the detected air-fuel ratio to the estimated air-fuel ratio. In this case, the air-fuel ratio of the mixture gas becomes away from the air-fuel ratio which can provide the expected engine property and when the detected air-fuel ratio finally becomes the estimated air-fuel ratio, the air-fuel ratio of the mixture gas becomes considerably smaller than the air-fuel which can provide the expected engine property. Thus, the property of the engine considerably separates from the expected engine property. On the other hand, even when the air-fuel ratio of the mixture gas should be decreased so as to conform the detected air-fuel ratio to the expected air-fuel ratio, the actual air-fuel ratio increases. Also, in this case, the air-fuel ratio of the mixture gas separates from the air-fuel ratio which can provide the expected engine property and when the detected air-fuel ratio finally conforms to the expected air-fuel ratio, the air-fuel ratio of the mixture gas becomes considerably larger than the air-fuel ratio which can provide the expected engine property. Thus, the property of the engine considerably separates from the expected engine property. However, according to the fourth embodiment, when the sign of the actual target EGR rate change rate is different from that of the referential target EGR rate change rate, the learning of the learned correction value is forbidden and therefore, the large separation of the property of the engine from the expected engine property is restricted.

It should be noted that when the sign of the actual target EGR rate change rate is different from that of the referential target EGR rate change rate, similar to the first embodiment, the calculated of the instant correction value is forbidden and therefore, the correction of the fuel injection amount for acquiring the base EGR rate by the instant correction value is forbidden.

Further, in the fourth embodiment, the correction of the fuel injection amount for acquiring the base EGR rate by a correction value calculated depending on a degree of the transient condition of the engine operation condition (i.e. a degree of the change of the engine operation condition) may be performed. Next, an embodiment which performs the correction of the fuel injection amount for acquiring the base EGR rate by the correction value calculated depending on the degree of the transient condition of the engine operation condition (hereinafter, this embodiment will be referred to as—fifth embodiment—) will be explained. It should be noted that the constitution of the fifth embodiment which is not explained below is the same as any of those of the explained embodiments or is one obviously expected from the above-explained embodiments.

In the fifth embodiment, the correction value for correcting the fuel injection amount for acquiring the base EGR rate so as to accomplish the expected engine property (hereinafter, this correction value will be referred to as—transient correction value—) is calculated depending on the degree of the transient condition of the engine operation condition, the fuel injection amount for acquiring the base EGR rate is corrected by this calculated transient correction value, the base EGR rate is acquired from the map shown in FIG. 2(C) using this corrected fuel injection amount for acquiring the base EGR rate and this acquired base EGR rate is set to the target EGR rate.

It should be noted that as a method for correcting the fuel injection amount for acquiring the base EGR rate by the transient correction value, there are various methods and for example, there is a method comprising calculating a correction coefficient by adding the instant correction value, the learned correction value multiplied by the transient correction value and "1" together as shown in FIG. 11, setting the fuel injection amount obtained by multiplying the target fuel injection amount by this calculated correction coefficient as shown in FIG. 12 to the fuel injection amount for acquiring the base EGR rate and setting the current engine speed to the engine speed for acquiring the base EGR rate, acquiring the base EGR rate from the map shown in FIG. 2(C) using these set fuel injection amount and engine speed and setting this acquired base EGR rate to the target EGR rate. In should be noted that in the formulas 11 and 12, "K" is the correction coefficient, "KT" is the learned correction value, "KTR" is the transient correction value, "Q" is the fuel injection amount for acquiring the base EGR rate and "TQ" and the target fuel injection amount.

$$K = KT + KG \times KTR + 1 \tag{11}$$

$$Q = TQ \times K \tag{12}$$

It should be noted that the correction of the fuel injection amount for acquiring the base EGR rate by the environmental and transient correction values may be performed.

Further, in the above-explained embodiments, the referential target EGR rate change rate is calculated when the actual target EGR rate change rate, however, the referential target EGR rate change rate may be previously calculated. That is, for example, in the case that the referential target EGR rate change rate is previously calculated in the first embodiment, a value of an environmental parameter for obtaining the expected engine property without correcting the fuel injection amount for acquiring the base EGR rate depending on the value of the environmental parameter (hereinafter, this value will be referred to as—proper value—) or a range of the value of the environmental parameter for obtaining the expected engine property without correcting the fuel injection amount for acquiring the base EGR rate depending the value of the environmental parameter (hereinafter, this range will be referred to as—proper range—) is previously obtained. Then, the ratio of the change amount of the target EGR rate relative to the change amount of the fuel injection amount for acquiring the base EGR rate is calculated and then, this calculated ratio is memorized in the electronic control unit as the referential target EGR rate change rate. Then, this memorized referential target EGR rate change rate is used.

It should be noted that the change rate of the target EGR rate may differ depending on the fuel injection amount for acquiring the base EGR rate used for the calculation of the referential target EGR rate. Therefore, it is preferred that in the case that the referential target EGR rate change rate is previously calculated, the referential target EGR rate change rate is calculated and memorized in the electronic control unit every fuel injection amount for acquiring the base EGR rate used for the calculation of the referential target EGR rate and then, when the actual referential target EGR rate change rate is used, the referential target EGR rate change rate corresponding to the current fuel injection amount for acquiring the base EGR rate is used.

It should be noted that in the above-explained embodiments, the fuel injection amount for acquiring the base EGR rate is corrected by the correction coefficient. However, this invention can be applied to the case that the base EGR rate is corrected by the correction coefficient and the case that the target EGR rate is corrected by the correction coefficient. It should be noted that in the case that the base EGR rate is corrected by the correction coefficient, a correction value for making the air-fuel ratio difference ratio become "1" by correcting the correction coefficient currently used for the correction of the base EGR rate is calculated as the instant correction value. Further, in the case that the target EGR rate is corrected by the correction coefficient, a correction value for making the air-fuel ratio difference ratio become "1" by correcting the correction coefficient currently used for the correction of the target EGR rate is calculated as the instant correction value.

Further, the above-explained embodiments are those obtained by applying this invention to the case that the air-fuel ratio of the mixture gas is controlled to correspond to the estimated air-fuel ratio by the control of the EGR rate by the EGR control valve. However, this invention can be applied to the case that the air-fuel ratio of the mixture gas is controlled to correspond to the estimated air-fuel ratio by the control of the intake air amount by the throttle valve in addition to the control of the EGR rate by the EGR control valve.

Further, the above-explained embodiments are those obtained by applying this invention to the compression ignition type internal combustion engine. However, this invention can be applied to the spark ignition type internal combustion engine (so-called gasoline engine).

The invention claimed is:

1. A control device for an internal combustion engine, comprising:
   at least one combustion chamber;
   an intake passage connected to the at least one combustion chamber;
   an exhaust passage connected to the at least one combustion chamber;
   an air-fuel ratio sensor provided in the exhaust passage for detecting an air-fuel ratio corresponding to an air-fuel ratio of mixture gas generated in the at least one combustion chamber;
   an EGR device having an EGR passage for recirculating exhaust gas to the intake passage, wherein the exhaust gas is discharged from the at least one combustion chamber to the exhaust passage,
   a relationship between (a) a predetermined parameter relating to an engine operation and (b) a base EGR amount corresponding to a base value of a target value of an amount of exhaust gas recirculated to the intake passage via the EGR passage being defined as a base relationship in advance; and
   an electronic control unit programmed to:
   (A) calculate an estimated air-fuel ratio corresponding to an estimated value of the air-fuel ratio of the mixture gas;
   (B) calculate an instant correction value corresponding to a correction value for correcting one of (a) the predetermined parameter and (b) the base EGR amount, such that an air-fuel ratio deviation corresponding to a deviation of the detected air-fuel ratio in reference to the estimated air-fuel ratio becomes zero;
   (C) perform a correction value learning to calculate a learned correction value corresponding to an accumulated value of the instant correction values calculated successively and memorize the learned correction value;
   (D) perform a base relationship correction to correct the base relationship regardless of the air-fuel ratio deviation to acquire a corrected base relationship so as to allow the engine to operate with an expected property;
   (E1) perform a correction of the predetermined parameter by the instant correction value and the learned correction value to acquire a corrected parameter, acquire the base EGR amount by applying the corrected parameter to the corrected base relationship and set the acquired base EGR amount as a target EGR amount; or
   (E2) acquire the base EGR amount by applying, to the corrected base relationship, a non-corrected parameter corresponding to the predetermined parameter which is not corrected by the instant and learned correction values and set, as the target EGR amount, a value acquired by correcting the base EGR amount by the instant and learned correction values;
   (F) perform an EGR control for controlling an operation state of a valve of the EGR device such that the target EGR amount of exhaust gas is recirculated to the intake passage via the EGR passage;
   (G) acquire a referential target amount corresponding to one of (a) the base EGR amount acquired by applying the corrected parameter to a non-corrected base relationship corresponding to the base relationship which is not corrected by the base relationship correction and (b) a value acquired by correcting the base EGR amount, which is acquired by applying the non-corrected parameter to the non-corrected base relationship, by the instant and learned correction values;
   (H) acquire an actual target amount corresponding to one of (a) the base EGR amount acquired by applying the corrected parameter to the corrected base relationship and (b) a value acquired by correcting the base EGR amount, which is acquired by applying the non-corrected parameter to the corrected base relationship, by the instant and learned correction values; and
   (I) forbid the performance of the correction value learning when a sign of a first ratio corresponding to a ratio of a change amount of the actual target EGR amount in reference to a change amount of the non-corrected parameter is different from a sign of a second ratio corresponding to a ratio of a change amount of the referential target EGR amount in reference to a change amount of the non-corrected parameter.

2. The control device for the engine according to claim 1, wherein the electronic control unit is further programmed to forbid one of (a) the correction of the predetermined parameter and (b) the correction of the base EGR amount by the learned correction value for setting the target EGR amount when the control device forbids the performance of the correction value learning.

3. The control device for the engine according to claim 1, wherein the electronic control unit is further programmed to forbid the performance of one of (a) the correction of the predetermined parameter and (b) the correction of the base EGR amount by the instant correction value for setting the target EGR amount when the electronic control unit forbids the performance of the correction value learning.

4. The control device for the engine according to claim 1, wherein the electronic control unit is further programmed to perform one of (a) the correction of the predetermined parameter and (b) the correction of the base EGR amount by a third ratio corresponding to a ratio of the second ratio in reference to the first ratio in addition to the instant and learned correction values for setting the target EGR amount when the third ratio is smaller than 1.

5. The control device for the engine according to claim 1, wherein the engine further comprises at least one fuel injector for supplying fuel to the at least one combustion chamber, and
the predetermined parameter is a target fuel-supply amount corresponding to a target value of an amount of fuel-supplied to the at least one combustion chamber by the at least one fuel injector.

6. The control device for the engine according to claim 5, wherein the engine further comprises an air flow meter for detecting a supplied-air amount corresponding to an amount of air supplied to the at least one combustion chamber, and
the electronic control unit is further programmed to:
(A1) calculate the estimated air-fuel ratio based on the target fuel-supply amount and the detected supplied-air amount; or (A2) acquire a corrected target fuel-supply amount by correcting the target fuel-supply amount by the instant and learned correction values and calculate the estimated air-fuel ratio based on the corrected target fuel-supply amount and the detected supplied-air amount.

7. The control device for the engine according to claim 1, wherein the engine comprises:
at least one fuel injector for supplying fuel to the at least one combustion chamber; and
an air flow meter for detecting a supplied-air amount corresponding to an amount of air supplied to the combustion chamber, and
the electronic control unit is further programmed to:
(A1) calculate the estimated air-fuel ratio based on a target fuel-supply amount corresponding to a target value of an amount of fuel-supplied to the at least one combustion chamber by the at least one fuel injector and the detected supplied-air amount; or
(A2) acquire a corrected target fuel-supply amount by correcting the target fuel-supply amount by the instant and learned correction values and calculate the estimated air-fuel ratio based on the corrected target fuel-supply amount and the detected supplied-air amount.

8. The control device for the engine according to claim 1, wherein the base relationship correction corresponds to one of:
(D1) a correction for correcting one of (a) the predetermined parameter based on an environmental parameter relating to environment which surrounds the engine and influences an engine operation condition and (b) the base EGR amount, which is acquired by applying the predetermined parameter to the non-corrected base relationship, based on the environmental parameter such that an actual EGR amount corresponding to an amount of exhaust gas recirculated to the intake passage via the EGR passage becomes an optimal amount for allowing the engine to operate with an expected property;
(D2) a correction for correcting one of (a) the predetermined parameter based on a transient change of the engine operation condition and (b) the base EGR amount, which is acquired by applying the predetermined parameter to the non-corrected base relationship, based on the transient change of the engine operation condition such that the actual EGR amount becomes the optimal amount when the engine operation condition changes transiently; and
(D3) a correction for correcting one of (a) the predetermined parameter based on the environmental parameter and (b) the base EGR amount, which is acquired by applying the predetermined parameter to the non-corrected base relationship, based on the environmental parameter such that the actual EGR amount becomes the optimal amount when the engine operation condition changes transiently.

9. The control device for the engine according to claim 1, wherein the electronic control unit is further programmed to:
(J) calculate an estimated EGR amount corresponding to an estimated value of an amount of exhaust gas recirculated to the intake passage via the EGR passage; and
(K) control the operation state of the EGR device by a feedback-control such that the deviation of the estimated EGR amount in reference to the target EGR amount becomes zero.

10. A control device for internal combustion engine, comprising:
at least one combustion chamber;
an intake passage connected to the at least one combustion chamber;
an exhaust passage connected to the at least one combustion chamber;
an air-fuel ratio sensor provided in the exhaust passage for detecting a detected air-fuel ratio corresponding to an air-fuel ratio of mixture gas generated in the at least one combustion chamber; an EGR device having an EGR passage for recirculating exhaust gas to the intake passage, wherein the exhaust gas is discharged from the at least one combustion chamber to the exhaust passage;
a relationship between (a) a predetermined parameter relating to the engine and (b) a base EGR amount corresponding to a base value of a target value of an amount of exhaust gas recirculated to the intake passage via the EGR passage being defined as a base relationship in advance; and
an electronic control unit programmed to:
(A) calculate an estimated air-fuel ratio corresponding to an estimated value of the air-fuel ratio of the mixture gas;
(B) calculate an instant correction value corresponding to a correction value for correcting one of (a) the predetermined parameter and (b) the base EGR amount, such that an air-fuel ratio deviation corresponding to a deviation of the detected air-fuel ratio in reference to the estimated air-fuel ratio becomes zero;
(C1) perform a correction value learning to calculate a learned correction value corresponding to an accumulated value of the instant correction values calculated successively and memorize the learned correction value;
(C2) calculate a first correction coefficient for removing a first deviation corresponding to a deviation of the air-fuel ratio deviation due to a difference related to the predetermined parameter and a second deviation corresponding to a deviation of the air-fuel ratio deviation due to a difference related to the intake air amount by dividing a correction coefficient defined by the instant and learned correction values depending on a ratio between the first and second deviation;
(D) perform a base relationship correction to correct the base relationship regardless of the air-fuel ratio deviation to acquire a corrected base relationship so as to allow the engine to operate with an expected property;
(E1) perform a correction of the predetermined parameter by the first correction coefficient to acquire a corrected parameter, acquire the base EGR amount by applying the corrected parameter to the corrected base relationship and set the acquired base EGR amount as a target EGR amount; or
(E2) acquire the base EGR amount by applying, to the corrected base relationship, a non-corrected parameter corresponding to the predetermined parameter which is not corrected by the first correction coefficient and set, as the target EGR amount, a value acquired by correcting the base EGR amount by the first correction coefficient;
(F1) acquire a corrected intake air amount by correcting an intake air amount corresponding to an amount of air supplied to the at least one combustion chamber and calculate, as an estimated EGR amount, an estimated value of an amount of exhaust gas recirculated to the intake passage via the EGR passage by using the corrected intake air amount; and (F2) perform an EGR control for controlling an operation state of a valve of the EGR device by a feedback control such that the estimated EGR amount corresponds to the target EGR amount, (G) acquire a referential target amount corresponding to one of (a) the base EGR amount acquired by applying the corrected parameter to a non-corrected base relationship corresponding to the base relationship which is not corrected by the base relationship correction and (b) a value acquired by correcting the base EGR amount, which is acquired by applying the non-corrected parameter to the non-corrected base relationship, by the first correction coefficient;

(H) acquire an actual target amount corresponding to one of (a) the base EGR amount acquired by applying the corrected parameter to the corrected base relationship and (b) a value acquired by correcting the base EGR amount, which is acquired by applying the non-corrected parameter to the corrected base relationship, by the first correction coefficient; and (I) forbid the performance of the correction value learning when a sign of a first ratio corresponding to a ratio of a change amount of the actual target EGR amount in reference to a change amount of the non-corrected parameter is different from a sign of a second ratio corresponding to a ratio of a change amount of the referential target EGR amount in reference to a change amount of the non-corrected parameter.

11. The control device for the engine according to claim 10, wherein the electronic control unit is further programmed to forbid the performance of one of (a) the correction of the predetermined parameter and (b) the correction of the base EGR amount by the instant correction value for setting the target EGR amount when the electronic control unit forbids the performance of the correction value learning.

12. The control device for the engine according to claim 10,
wherein the electronic control unit is further programmed to perform one of (a) the correction of the predetermined parameter and (b) the correction of the base EGR amount by the third ratio corresponding to a ratio of the second ratio in reference to the first ratio in addition to the first correction coefficient for setting the target EGR amount when the third ratio is smaller than 1.

13. The control device for the engine according to claim 10,
wherein the engine further comprises at least one fuel injector for supplying fuel to the at least one combustion chamber, and
the predetermined parameter is a target fuel-supply amount corresponding to the target value of an amount of fuel-supplied to the at least one combustion chamber by the at least one fuel injector.

14. The control device for the engine according to claim 13,
wherein the engine further comprises an air flow meter for detecting a detected supplied-air amount corresponding to an amount of air supplied to the at least one combustion chamber, and the electronic control unit is further programmed to:
(A1) calculate the estimated air-fuel ratio based on the target fuel-supply amount and the detected supplied-air amount; and
(A2) acquire a corrected target fuel-supply amount by correcting the target fuel-supply amount by the first correction coefficient and calculate the estimated air-fuel ratio based on the corrected target fuel-supply amount and the detected supplied-air amount.

15. The control device for the engine according to claim 10,
wherein the engine further comprises:
at least one fuel injector for supplying fuel to the at least one combustion chamber;
an air flow meter for detecting a detected supplied-air amount corresponding to an amount of air supplied to the combustion chamber, and
the electronic control unit is further programmed to:
(A1) calculate the estimated air-fuel ratio based on a target fuel-supply amount corresponding to a target value of an amount of fuel injector and the detected supplied air amount; or
(A2) acquire a corrected target fuel-supply amount by correcting the target fuel-supply amount by the first correction coefficient and calculate the estimated air-fuel ratio based on the corrected target fuel-supply amount and the detected supplied-air amount.

16. The control device for the engine according to claim 10,
wherein the base relationship correction corresponds to one of:
(D1) a correction for correcting one of (a) the predetermined parameter based on an environmental parameter relating to an environment which surrounds the engine and influences an engine operation condition and (b) the base EGR amount, which is acquired by applying the predetermined parameter to the non-corrected base relationship, based on the environmental parameter such that an actual EGR amount corresponding to an amount of exhaust gas recirculated to the intake passage via the EGR passage becomes an optimal amount for allowing the engine to operate with an expected property;
(D2) a correction for correcting one of (a) the predetermined parameter based on a transient change of the engine operation condition and (b) the base EGR amount, which is acquired by applying the predetermined parameter to the non-corrected base relationship, based on the transient change of the engine operation condition such that the actual EGR amount becomes the optimal amount when the engine operation condition changes transiently; and
(D3) a correction for correcting one of (a) the predetermined parameter based on the environmental parameter and (b) the base EGR amount, which is acquired by applying the predetermined parameter to the non-corrected base relationship, based on the environmental parameter such that the actual EGR amount becomes the optimal amount when the engine operation condition changes transiently.

* * * * *